US008074340B2

(12) United States Patent
Cicenas et al.

(10) Patent No.: US 8,074,340 B2
(45) Date of Patent: Dec. 13, 2011

(54) INCREASED AND VARIABLE FORCE AND MULTI-SPEED CLAMPS

(75) Inventors: Chris W. Cicenas, Columbus, OH (US); Charles R. McKean, Mount Vernon, OH (US); Thomas M. Chervenak, Stanley, NC (US); Anthony B. Fuller, Mooresville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 12/714,628

(22) Filed: Mar. 1, 2010

(65) Prior Publication Data

US 2010/0156013 A1 Jun. 24, 2010

Related U.S. Application Data

(63) Continuation of application No. 10/486,583, filed on Aug. 5, 2004, now Pat. No. 7,699,297.

(51) Int. Cl.
*B23Q 7/00* (2006.01)

(52) U.S. Cl. ..................... 29/559; 269/3; 269/95; 269/6

(58) Field of Classification Search .................... 29/559, 29/270–278; 269/3, 6, 95, 166, 249, 149
See application file for complete search history.

(56) References Cited

U.S. PATENT DOCUMENTS 100,642 A 3/1870 Lambert
153,206 A 7/1874 Wagoner
226,617 A 4/1880 Konig
267,152 A 11/1882 Cloud
376,623 A 1/1888 Bain
404,368 A 5/1889 Stearns
408,473 A 8/1889 Focken
410,815 A 9/1889 Tarbell
416,096 A 11/1889 Dom
491,633 A 2/1893 Bourassa
678,805 A 7/1901 Weyland
749,732 A 1/1904 Hanson et al.
757,166 A 4/1904 Wintsch, Jr.
775,659 A 11/1904 Jorgensen
792,758 A 6/1905 Colt
927,067 A 7/1909 Offineer (Continued)

FOREIGN PATENT DOCUMENTS

AU 225561 4/1959

(Continued)

OTHER PUBLICATIONS

Co-pending U.S. Appl. No. 10/572,661, filed Mar. 20, 2006.

(Continued)

*Primary Examiner* — Lee D Wilson
(74) *Attorney, Agent, or Firm* — Esther F. Queen; Dennis J. Williamson; Moore & Van Allen, PLLC

(57) ABSTRACT

A method of operating a clamp (100) that includes a first clamping jaw (102), a support element (104) to which the first clamping jaw is attached and a trigger handle (118) pivotably mounted to a clamp body (112). The method includes actuating the trigger handle causing the first clamping jaw to experience incremental motion and varying the incremental motion as a function of a load encountered by the support element by varying an effective lever arm of the trigger handle by moving a fulcrum point into contact or out of contact with the trigger handle based on the load.

16 Claims, 19 Drawing Sheets

U.S. PATENT DOCUMENTS

| | | | |
|---|---|---|---|
| 934,589 | A | 9/1909 | Bradford |
| 1,241,215 | A | 9/1917 | Hoffman |
| 1,340,092 | A | 5/1920 | Tuscher, Jr. |
| 1,393,766 | A | 10/1921 | Du Charme |
| 1,402,621 | A | 1/1922 | Knittel et al. |
| 1,452,753 | A | 4/1923 | Otto et al. |
| 1,543,197 | A | 6/1925 | Ulrich |
| 1,583,611 | A | 5/1926 | Seely |
| 1,639,561 | A | 8/1927 | Hargrave |
| 1,783,713 | A | 12/1930 | Holman |
| 1,811,518 | A | 6/1931 | Palmer |
| 1,890,042 | A | 12/1932 | Morandi |
| 2,133,892 | A | 10/1938 | Gelinski |
| 2,157,345 | A | 5/1939 | Nelson |
| 2,468,358 | A | 4/1949 | Clark |
| 2,656,864 | A | 10/1953 | Hopfeld |
| 2,781,803 | A | 2/1957 | Nelson |
| 2,815,053 | A | 12/1957 | Walker |
| 2,815,778 | A | 12/1957 | Holman |
| 2,923,334 | A | 2/1960 | Brennan, Jr. |
| 2,949,947 | A | 8/1960 | Story |
| 3,033,559 | A | 5/1962 | Lindholm |
| 3,159,393 | A | 12/1964 | Villano |
| 3,173,674 | A | 3/1965 | Ringle |
| 3,331,111 | A | 7/1967 | Carver |
| 3,575,405 | A | 4/1971 | Harding |
| 3,596,898 | A | 8/1971 | Hilburn |
| D222,872 | S | 1/1972 | Boucher |
| D227,192 | S | 6/1973 | Schafhauser |
| 3,806,107 | A | 4/1974 | Pitzer et al. |
| 3,914,830 | A | 10/1975 | Bolton |
| D238,140 | S | 12/1975 | Guimarin |
| 3,933,346 | A | 1/1976 | Carver |
| 3,963,230 | A | 6/1976 | Jankowski, Jr. |
| 4,042,264 | A | 8/1977 | Shumer |
| 4,078,781 | A | 3/1978 | Fraser et al. |
| 4,083,548 | A | 4/1978 | Hackbarth |
| 4,088,313 | A | 5/1978 | Pearson |
| 4,132,397 | A | 1/1979 | Ward |
| 4,143,869 | A | 3/1979 | Paterson et al. |
| D259,327 | S | 5/1981 | Sloane |
| 4,306,710 | A | 12/1981 | Vosper |
| 4,339,113 | A | 7/1982 | Vosper |
| 4,381,105 | A | 4/1983 | Goff et al. |
| D279,646 | S | 7/1985 | Ferdinand et al. |
| 4,563,921 | A | 1/1986 | Wallace |
| D286,369 | S | 10/1986 | Hahn |
| 4,850,254 | A | 7/1989 | Burney |
| 4,874,155 | A | 10/1989 | Goul |
| 4,893,801 | A | 1/1990 | Flinn |
| 4,926,722 | A | 5/1990 | Sorensen et al. |
| 4,989,847 | A | 2/1991 | Chapman |
| 5,005,449 | A | 4/1991 | Sorensen et al. |
| 5,009,134 | A | 4/1991 | Sorensen et al. |
| 5,022,137 | A | 6/1991 | Sorensen et al. |
| D320,919 | S | 10/1991 | Sorensen |
| 5,094,131 | A | 3/1992 | Sorensen et al. |
| 5,096,170 | A | 3/1992 | Albin |
| D328,846 | S | 8/1992 | Sorensen et al. |
| 5,156,508 | A | 10/1992 | Grisley |
| 5,161,787 | A | 11/1992 | Hobday |
| 5,170,682 | A | 12/1992 | Sorensen et al. |
| D333,602 | S | 3/1993 | Gatzemayer et al. |
| D333,963 | S | 3/1993 | Goodman |
| 5,197,360 | A | 3/1993 | Wooster, Jr. |
| 5,217,213 | A | 6/1993 | Lii |
| 5,222,420 | A | 6/1993 | Sorensen et al. |
| D340,632 | S | 10/1993 | Easley |
| D341,069 | S | 11/1993 | Sorensen |
| D346,942 | S | 5/1994 | Sawdon |
| 5,326,076 | A | 7/1994 | Sorensen et al. |
| 5,346,194 | A | 9/1994 | Coffin |
| D355,104 | S | 2/1995 | Sorensen et al. |
| D357,165 | S | 4/1995 | Sorensen et al. |
| 5,443,246 | A | 8/1995 | Peterson |
| 5,454,551 | A | 10/1995 | Hobday |
| D365,263 | S | 12/1995 | Sorensen et al. |
| D366,819 | S | 2/1996 | Wooster, Jr. et al. |
| D366,820 | S | 2/1996 | Wooster, Jr. et al. |
| 5,692,734 | A | 12/1997 | Aldredge, Sr. |
| 5,775,680 | A | 7/1998 | Sorensen et al. |
| 5,826,310 | A | 10/1998 | Hobday |
| 5,853,168 | A | 12/1998 | Drake |
| 5,988,616 | A | 11/1999 | Fuller et al. |
| 6,254,073 | B1 | 7/2001 | Noniewicz et al. |
| 6,302,386 | B1 | 10/2001 | Fuller et al. |
| 6,338,475 | B1 | 1/2002 | Ping |
| 6,347,791 | B1 | 2/2002 | Chervenak |
| 6,367,787 | B1 | 4/2002 | Poole et al. |
| 6,382,608 | B1 | 5/2002 | Michell |
| 6,386,530 | B1 | 5/2002 | Marks |
| 6,412,767 | B1 | 7/2002 | Beckmann et al. |
| 6,578,837 | B1 | 6/2003 | Blank et al. |
| 6,860,179 | B2 | 3/2005 | Hopper et al. |
| 6,929,253 | B2 | 8/2005 | Marks |
| 7,090,209 | B1 | 8/2006 | Rowlay |
| 7,131,642 | B1 | 11/2006 | Rowlay et al. |
| 7,624,974 | B2 | 12/2009 | Zheng |
| 2002/0070490 | A1 | 6/2002 | Klimach et al. |
| 2003/0030205 | A1 | 2/2003 | Klimach et al. |
| 2004/0195746 | A1 | 10/2004 | Marks |
| 2005/0082728 | A1 | 4/2005 | Cicenas et al. |
| 2007/0069437 | A1 | 3/2007 | Rowlay et al. |
| 2007/0069438 | A1 | 3/2007 | Rowlay et al. |
| 2007/0194510 | A1 | 8/2007 | Geier et al. |

FOREIGN PATENT DOCUMENTS

| | | |
|---|---|---|
| FR | 2611160 | 7/1994 |
| TW | 136083 | 6/1990 |

OTHER PUBLICATIONS

Co-pending U.S. Appl. No. 10/566,781, filed Jan. 31, 2006.

"Pony Steel Bar Clamp Fixtures" styles 5, 52 and 56. Publication source and date unknown. It is believed that this publication was available to the public prior to Jul. 15, 1993.

Bessey Steel Bar Clamp Fixture RS 75 instructions. Publication source and date unknown. It is believed that this publication was available to the public prior to Jul. 15, 1993.

Advertisement for Bessey Bar Clamps Styles 52, 53, and 56. Publication source and date unknown. It is believed that this publication was available to the public prior to Jul. 15, 1993.

Advertisement for Bessey Bar Clamps Styles 43 and 45. Publication source and date unknown. It is believed that this publication was available to the public prior to Jul. 15, 1993.

Advertisement for Gross Stabil Clamp. Publication source and date unknown. It is believed that this publication was available to the public prior to Jul. 15, 1993.

"Pony Clamp Fixtures" styles 50, 52, 53 and 56. "Jorgensen Style 3500 Aluminum Bar Clamps." "Jorgensen Style 7200 Steel I-Bar Clamps." Publication source and date unknown. It is believed that this publication was available to the public prior to Jul. 15, 1993.

"Catalog—American Tool Companies, Inc.," advertisement of American Tool Companies, In., pp. 2-1 through 2-3 and 2-5 through 2-6. It is believed that the catalog was published in Oct. 1997.

Fig. 18
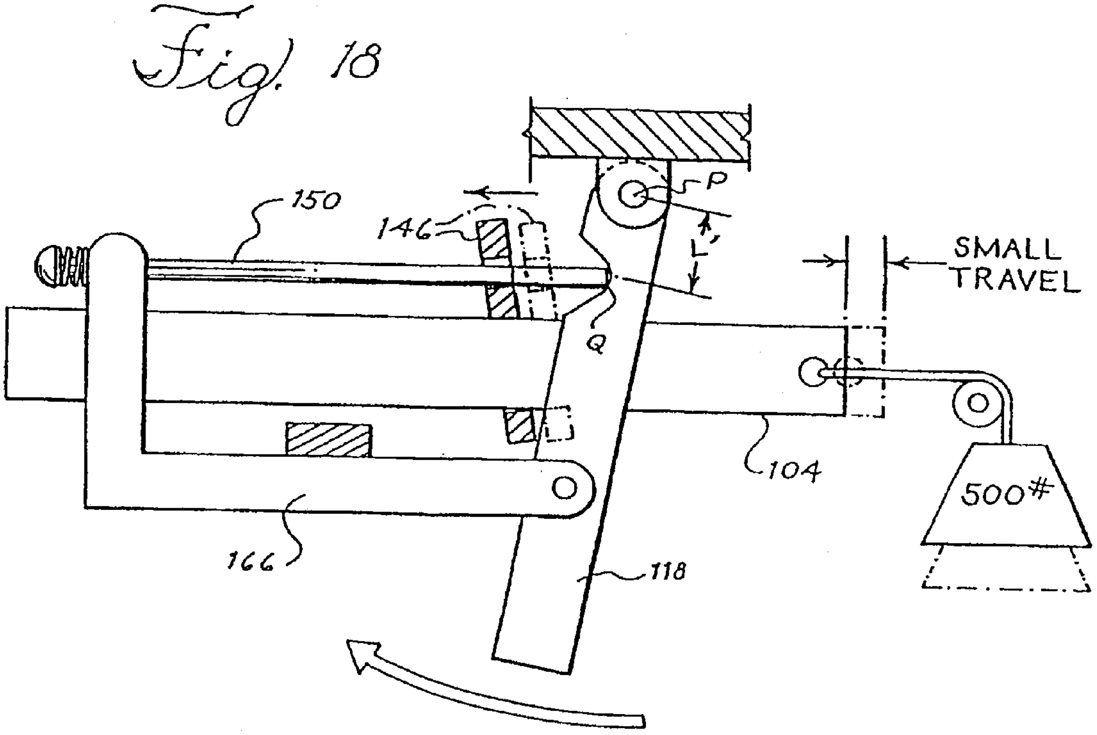
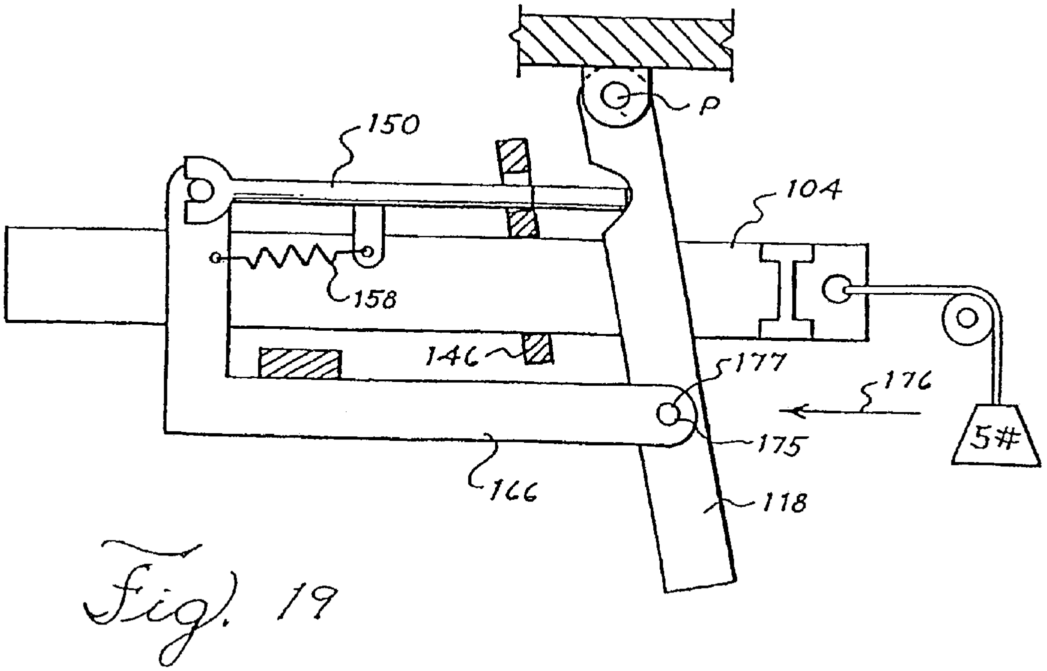
Fig. 19

INCREASED AND VARIABLE FORCE AND MULTI-SPEED CLAMPS

CROSS-REFERENCE TO RELATED APPLICATION

This application is a continuation of co-pending, commonly owned U.S. patent application Ser. No. 10/486,583, as filed on Aug. 5, 2004 and entitled "Increased and Variable Force and Multi-Speed Clamps," the entire contents of which are incorporated herein by reference, which claims, under 35 U.S.C. §119(e), the benefit of priority of the filing date of Aug. 10, 2001 of U.S. Provisional Patent Application Publication No. 60/311,569, filed on Aug. 10, 2001, the entire contents of which are incorporated herein by reference, and also claims, under 35 U.S.C. §§120 and 365, the benefit of priority of the filing date of Jul. 25, 2002 of a Patent Cooperation Treaty patent application having Serial Number PCT/US02/23663, filed on Jul. 25, 2002, the entire contents of which are incorporated herein by reference.

BACKGROUND OF THE INVENTION

1. Field of the Invention

This invention relates to a clamp that varies and/or increases the force applied to a clamped object and varies the speed of clamping an object.

2. Discussion of Related Art

Bar clamps for clamping objects into position are well known in the art. In recent years, advances have been made in bar clamps that enable them to be operated by a single hand. An example of such a bar clamp is disclosed in U.S. Pat. No. 4,926,722 which discloses a trigger mechanism to move a movable clamping jaw toward a fixed clamping jaw. The movable clamping jaw is attached to a moving bar.

Spreading clamps that are operable by a single hand are also well known, such as described in U.S. Pat. No. 5,009,134. Again, the movable jaw is attached to a bar.

In bar clamps and spreading clamps similar to those disclosed above, it may take a large number of strokes of the trigger mechanism to move a clamping jaw against an object. Accordingly, it may take a significant amount of time to clamp an object.

In clamps and spreading clamps similar to those disclosed above, it might be difficult to generate sufficient clamping forces on an object.

In clamps and spreading clamps similar to those disclosed above it also may be difficult to fine-tune the clamping pressure once the clamping jaw contacts the object to be clamped.

SUMMARY OF THE INVENTION

One aspect of the present invention regards a clamp that includes a first clamping jaw, a support element to which the first clamping jaw is attached, a clamp body having a slot through which the support element passes and a handle grip attached to the clamp body. A trigger handle is pivotably mounted to the clamp body and a trigger handle reinforcement is attached to the trigger handle and a driving lever that is movable to a first position where the driving lever engages the support element and causes the support element to move relative to the clamp body and wherein pivoting of the trigger handle causes the trigger handle reinforcement to pivot and engage the driving lever.

A second aspect of the present invention regards a clamp that includes a first clamping jaw, a support element to which the first clamping jaw is attached, a clamp body having a slot through which the support element passes, a handle grip attached to the clamp body and a trigger handle pivotably mounted to the clamp body. A driving lever that is movable to a first position where the driving lever engages the support element and causes the support element to move relative to the clamp body and a discriminating structure engaging the driving lever and the trigger handle, wherein the discriminating structure varies incremental motion of the support element as a function of a load encountered by the support element by having an effective lever arm of the trigger handle be varied by a fulcrum point that moves into contact or out of contact with the trigger handle based on the load.

A third aspect of the present invention regards a method of operating a clamp that includes a first clamping jaw, a support element to which the first clamping jaw is attached and a trigger handle pivotably mounted to a clamp body. The method includes actuating the trigger handle causing the first clamping jaw to experience incremental motion and varying the incremental motion as a function of a load encountered by the support element by varying an effective lever arm of the trigger handle by moving a fulcrum point into contact or out of contact with the trigger handle based on the load.

A fourth aspect of the present invention regards a clamp that includes a first clamping jaw, a support element to which the first clamping jaw is attached, a clamp body having a slot through which the support element passes, a handle grip attached to the clamp body and a trigger handle pivotably mounted to the clamp body. A trigger handle reinforcement is attached to the trigger handle, a driving lever that is movable to a first position where the driving lever engages the support element and causes the support element to move relative to the clamp body and first and second braking levers.

A fifth aspect of the present invention regards a method of operating a clamp that includes a first clamping jaw, a support element to which the first clamping jaw is attached, a trigger handle pivotably mounted to a clamp body and a braking system attached to the clamp body. The method includes applying a first load to the support element and reducing a portion, but not all, of the applied load by actuating the braking system so that the support element encounters a second load.

A sixth aspect of the present invention regards a clamp that includes a first clamping jaw, a support element to which the first clamping jaw is attached, a clamp body having a slot through which the support element passes, a handle grip attached to the clamp body and a trigger handle pivotably mounted to the clamp body about an axis. A driving lever is movable to a first position where the driving lever engages the support element and causes the support element to move relative to the clamp body. A power bar is attached to the driving lever and the trigger handle, wherein the power bar is attached to the trigger handle to establish a fulcrum to transfer power during pivoting of the trigger handle to the driving lever.

A seventh aspect of the present invention regards a clamp that includes a first clamping jaw, a support element to which the first clamping jaw is attached, a clamp body having a slot through which the support element passes, a handle, grip attached to the clamp body and a trigger handle pivotably mounted to the clamp body about an axis, wherein the trigger handle defines a first lever. A second lever is pivotably attached to the handle grip at a first pivot point and pivotably attached to the trigger handle at a second pivot point. A driving lever that is movable to a first position where the driving lever engages the support element and causes the support element to move relative to the clamp body and wherein, upon a force being applied to the trigger handle, the first lever is moved towards the second lever thereby moving the driving lever and the support element. [0016] An eighth aspect of the present invention regards a trigger mechanism that includes a support element, a clamp body having a slot through which the support element passes and generally dividing the clamp body into an upper and a lower portion and a clamping jaw secured to the upper portion of the clamp body and a cushioning pad affixed to the clamping jaw. A handle grip is attached to the lower portion of the clamp body and a long lever straddles the support element, the long lever coming together at one end in a trigger handle and coming together at a generally opposite end in a pivot point and movably associated at the pivot point to the upper portion of the clamp body. A short lever having a first pivot point associated with the handle grip and a second pivot point associated with the long lever, the second pivot point generally located between the support element and the first clamping jaw. A power tab is insertable over the support element in a recess within the clamp body and biased against the short lever and a spring is insertable over the support element with the recess of the clamp body, the spring seated on the clamp body biasing the power tab against the short lever, wherein, upon a compression force being applied to the handle grip and trigger handles, the long lever is moved towards the short lever thereby exerting an opposing force against the spring moving the power tab along the support element so that upon release of the compression force the clamp is moved an infinitesimal distance along the support element.

A ninth aspect of the present invention regards a method for compressing an object that includes applying a compression force to a long lever at first pivot point so that the long lever is moved closer to a short lever and the angle between the long lever and short lever decreases and presenting an actuator point of the short lever to a power tab wherein the force applied to the long lever provides for the disengagement of the power tab with a support element and movement of the power tab along the support element in a direction opposite of the compression force, wherein the compression of an object contained between a plurality of jaws acted upon by the levers is finely tuned.

One or more aspects of the present invention provide the advantage of reducing the time to move a clamping jaw against an object.

One or more aspects of the present invention provides the advantage of fine tuning the clamping pressure once the clamping jaw contacts the object to be clamped.

One or more aspects of the present invention provide the advantage of increasing the clamping pressure applied to an object.

One or more aspects of the present invention provide the advantage of incrementally decreasing the clamping force applied to an object.

One or more aspects of the present invention provide the advantage of increasing the speed of clamping dependent on the load being applied.

One or more aspects of the present invention are also included other than the embodiments above.

The present invention should not be limited to explicitly described embodiments herein. Numerous additions, substitutions and other changes can be made to the invention without departing from its scope as set forth in the appended claims.

The foregoing features and advantages of the present invention will be further understood upon consideration of the following detailed description of the invention taken in conjunction with the accompanying drawings, in which:

BRIEF DESCRIPTION OF THE DRAWINGS

FIG. 18 schematically shows the operation of the bar clamp of FIG. 1 when a high force is applied while the trigger is at a closed position;

FIG. 19 schematically shows the operation of a second embodiment of a bar clamp when a low force is applied while the trigger is at a neutral position;

DESCRIPTION OF THE PREFERRED EMBODIMENT(S)

Figure 1:
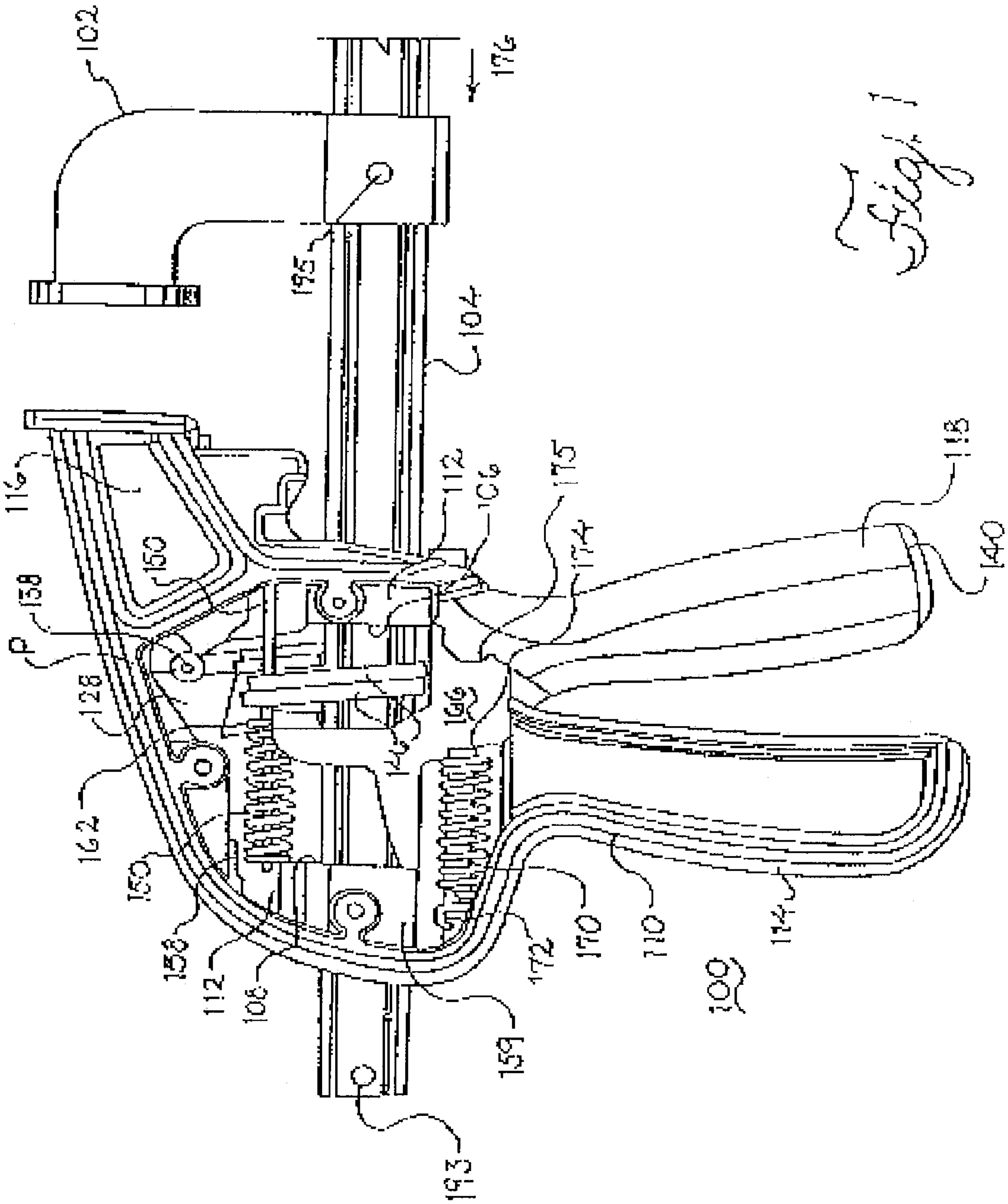
FIG. 1 shows a side view of an embodiment of a bar clamp according to the present invention when the trigger is at a neutral position.
Figure 14:
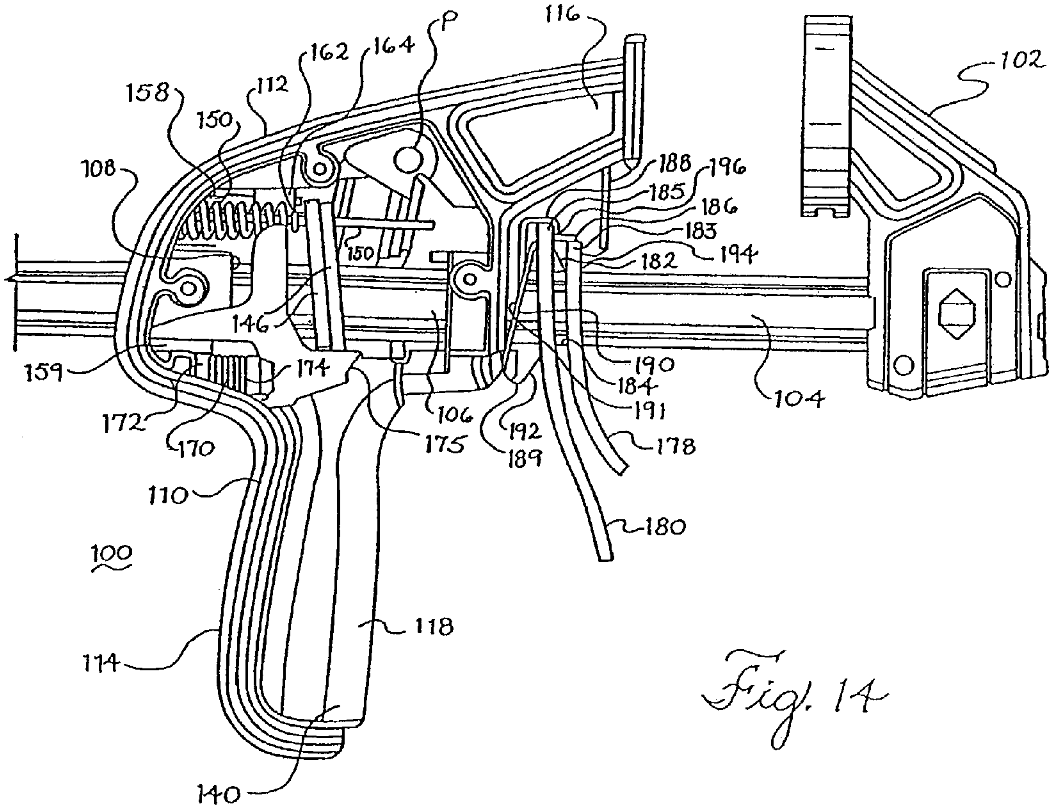
FIG. 14 shows a side view of the bar clamp of FIG. 1 when the trigger is at a closed position.
Figure 16:
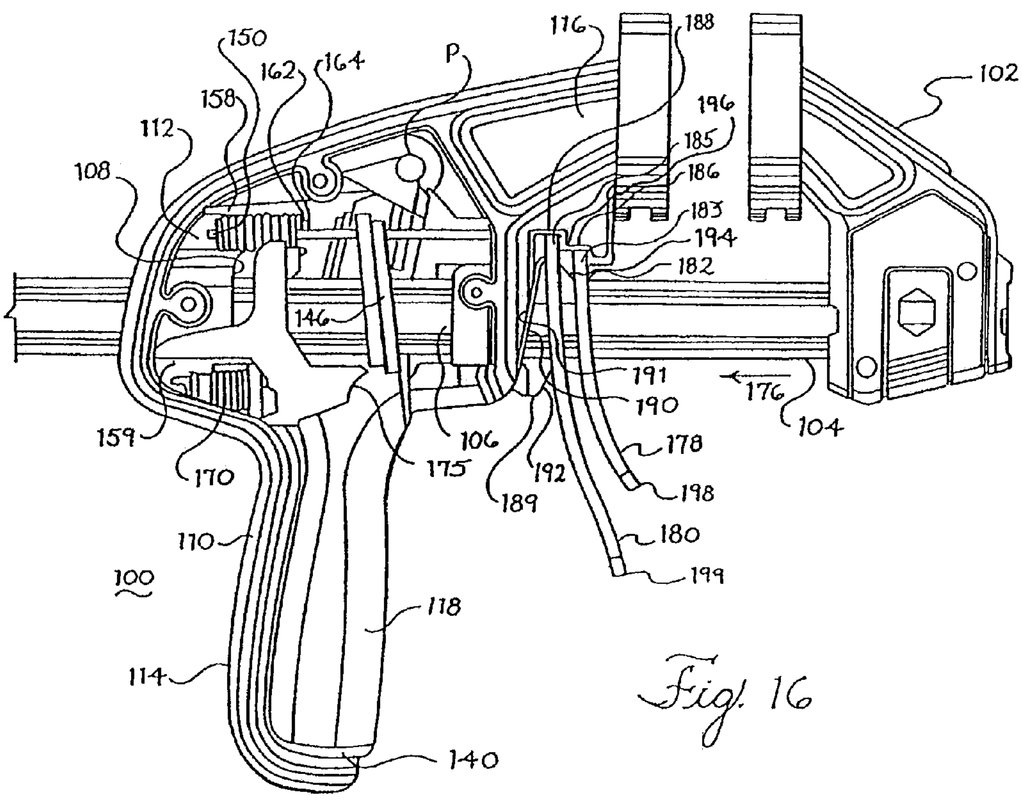
FIG. 16 shows a side view of the bar clamp of FIG. 1 when a high force is applied while the trigger is at a closed position.

Referring now to the drawings wherein like reference characters designate identical or corresponding parts throughout the several figures, and in particular FIGS. 1, 14 and 16 show a clamp, such as bar clamp 100. The bar clamp 100 includes a clamping jaw 102 connected to a support element, such as a rod or a bar 104. The clamping jaw 102 may be fixed to the rod or bar 104 via a pin in the manner disclosed in U.S. Pat. No. 4,926,722 or it may have a detachable structure such as disclosed in U.S. patent application Ser. No. 09/036,360, the entire contents of each of which are incorporated herein by reference. The bar 104 is slidably supported in a proximal slot or bore 106 and a distal slot or bore 108, each of which passes through a handle/grip assembly 110.

Figure 2:
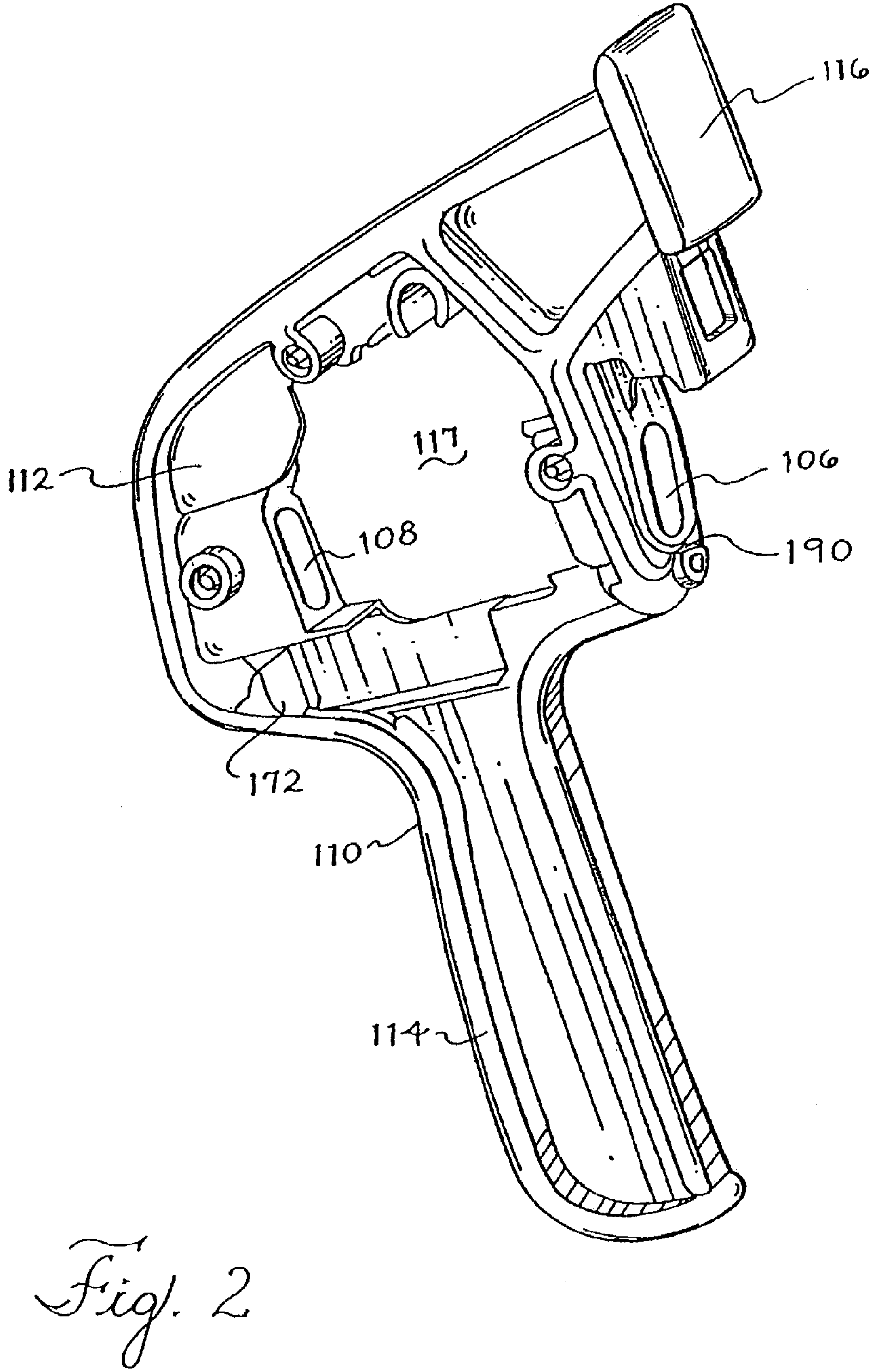
FIG. 2 shows a right perspective view of an embodiment of a clamp body to be used with the bar clamp of FIG. 1.
Figure 3:
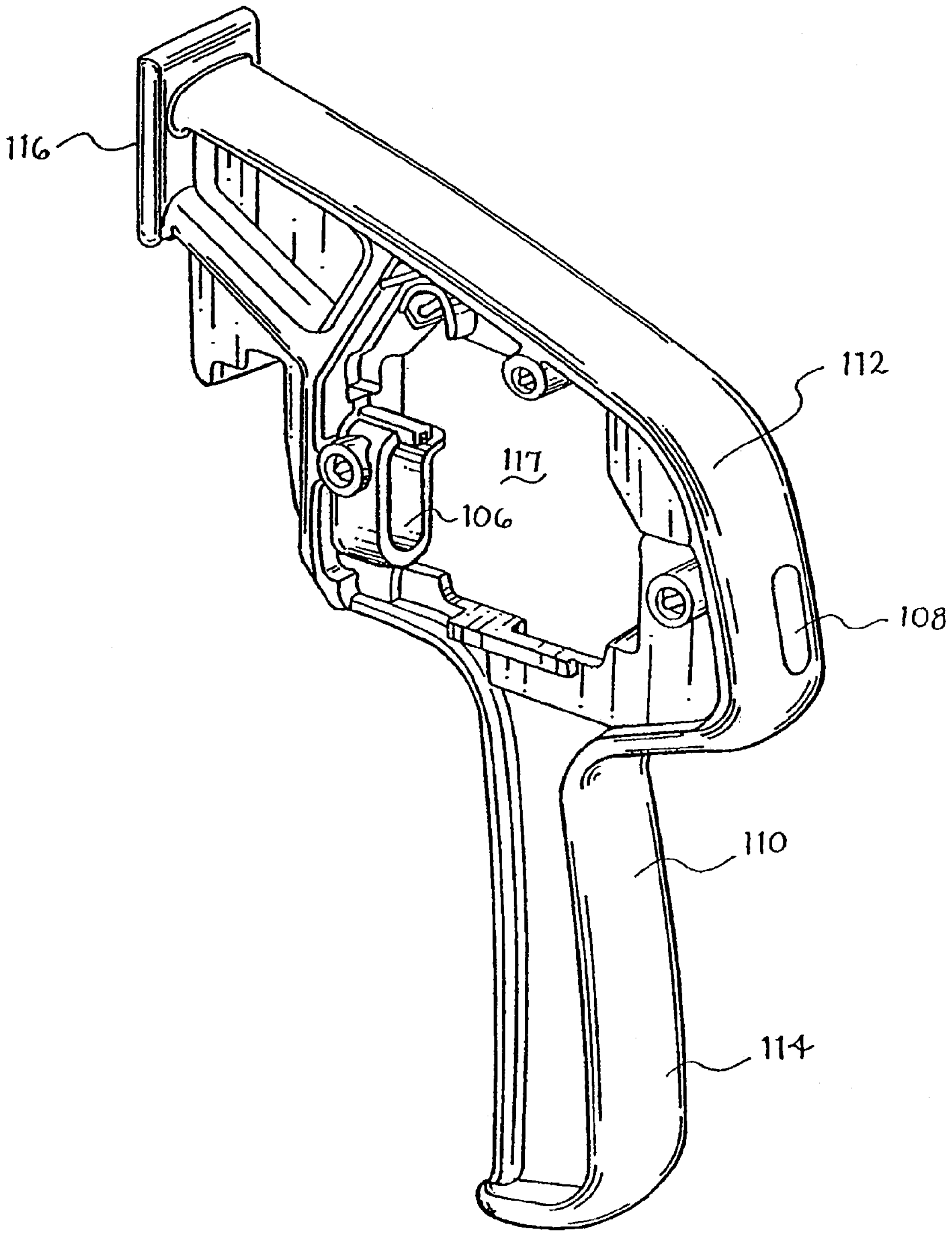
FIG. 3 shows a left perspective view of the clamp body of FIG. 2.

As shown in FIGS. 2 and 3, the handle/grip assembly 110 includes a clamp body 112 through which the slots 106 and 108 pass, a handle grip 114 attached to the clamp body 112 on one side of the slots 106 and 108, and a fixed clamping jaw 116 attached to the clamp body 112 on the other side of the slots 106 and 108. A cavity 117 in the clamp body 112 divides the bores 106 and 108 from one another. Note that protective pads may be attached to the jaws 102 and 116.

Figure 4A:
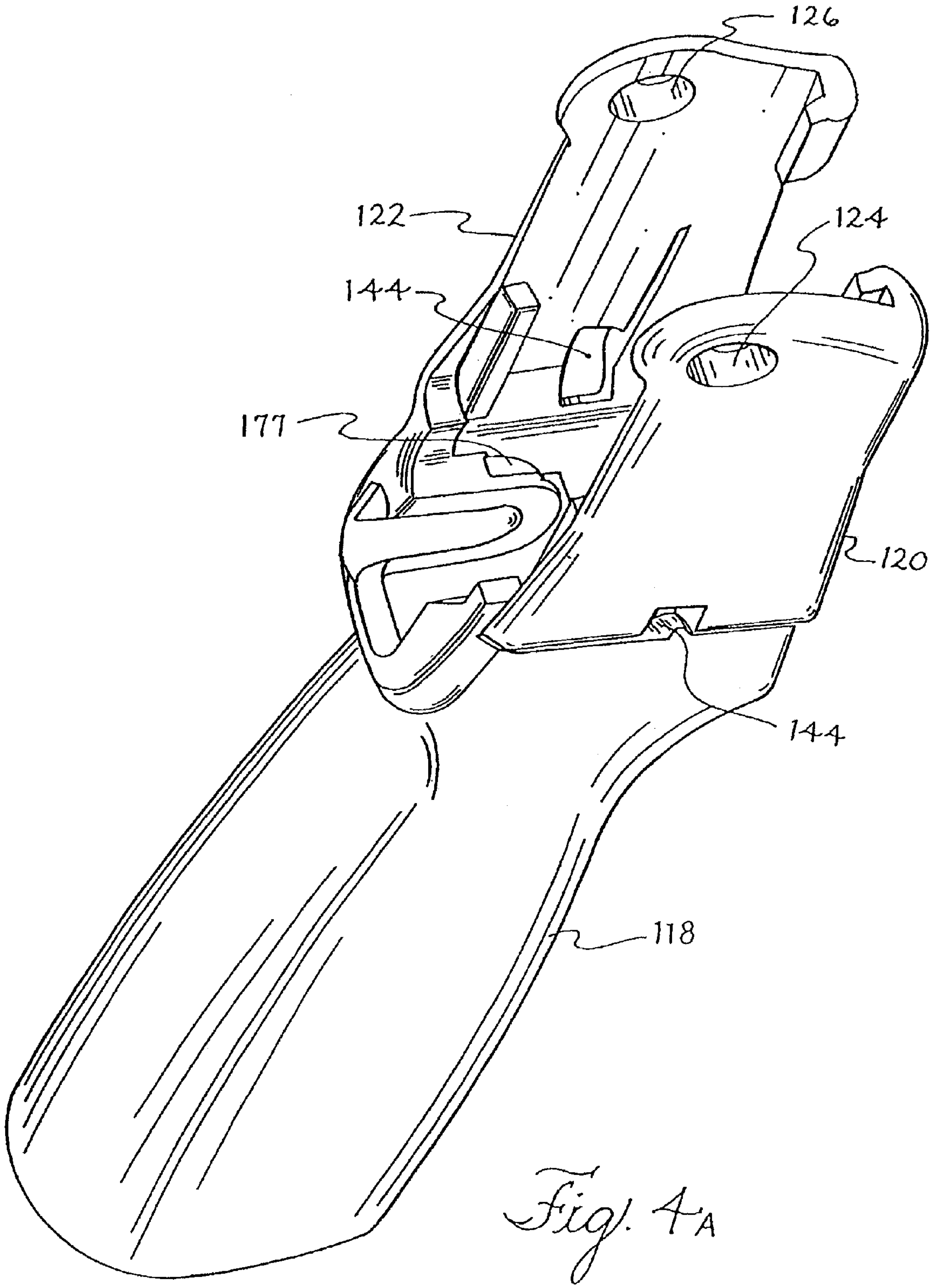
FIG. 4A shows a front, top perspective view of an embodiment of a trigger handle to be used with the bar clamp of FIG. 1.
Figure 4B:
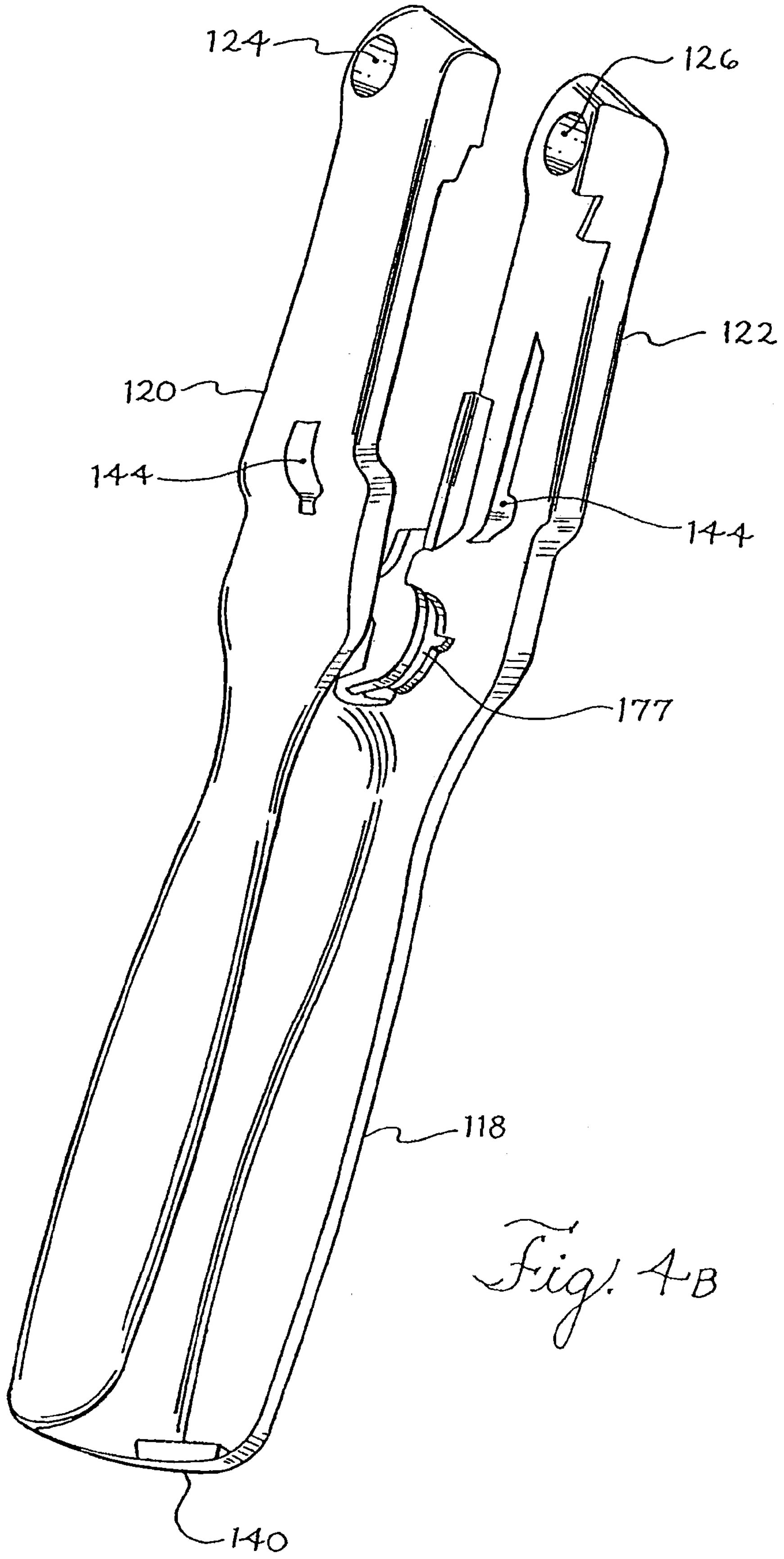
FIG. 4B shows a rear perspective view of the trigger handle of FIG. 4A.

A trigger handle 118 is pivotably mounted to the body 112 above and between the slots 106 and 108. As shown in FIGS. 4A-B, the trigger handle 118 has a left upper arm 120 and a right upper arm 122 that each have a length of approximately 2.5 inches and are spaced from one another by approximately 1.0 inches. The left upper arm 120 has an opening 124 that is aligned with a left side opening of a channel that is formed in the clamp body 112. Similarly, the right upper arm 122 has an opening 126 that is aligned with a right side opening of the channel.

Figure 5A:
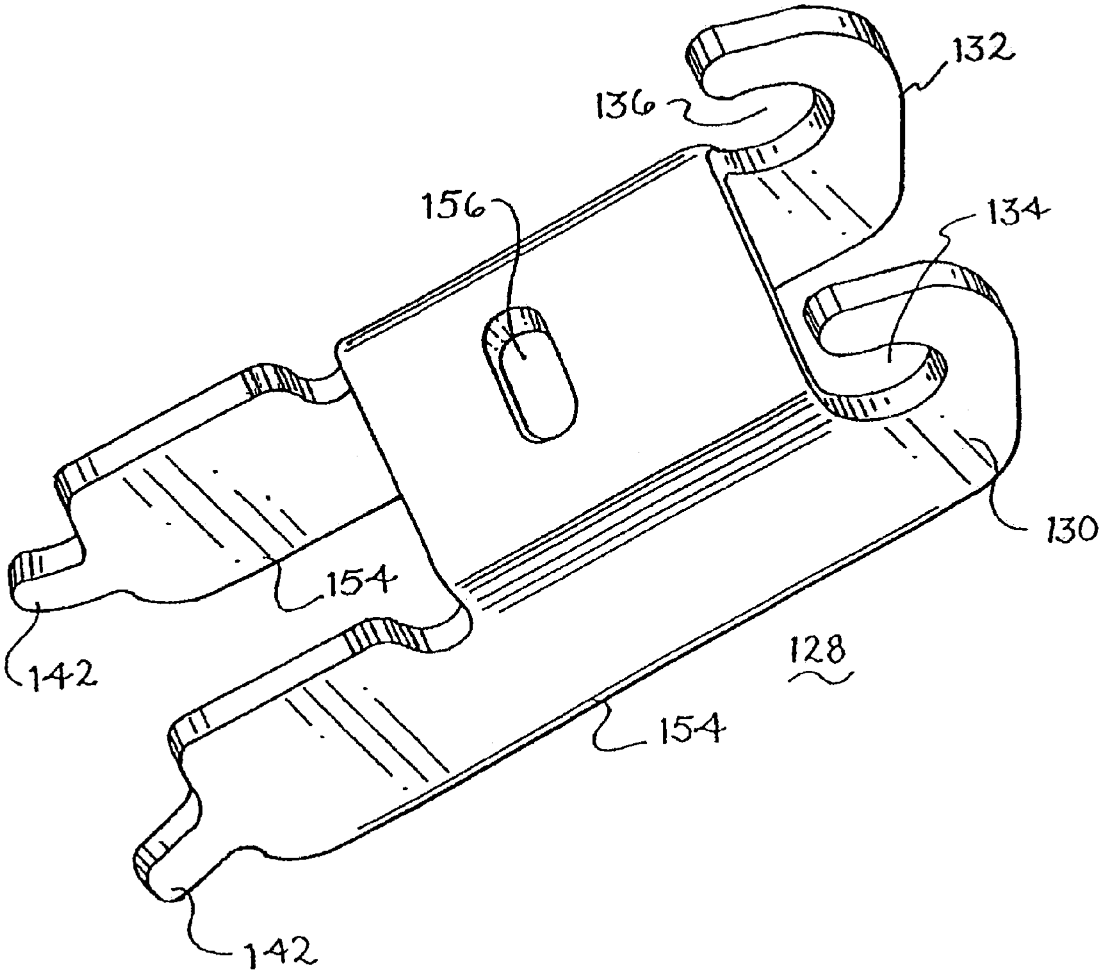
FIG. 5A shows a front perspective view of an embodiment of a trigger handle reinforcement to be used with the bar clamp of FIG. 1.
Figure 5B:
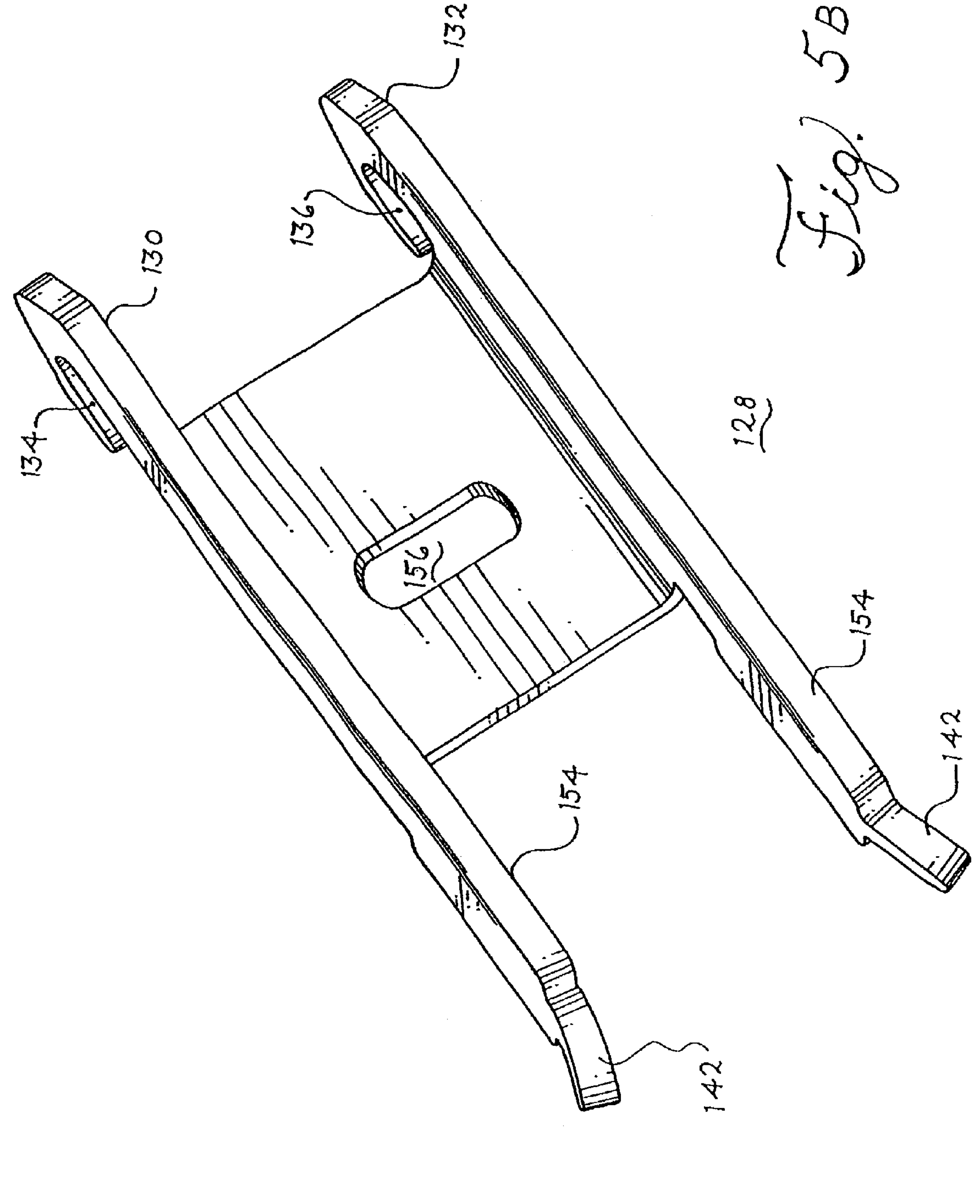
FIG. 5B shows a rear perspective view of the trigger handle reinforcement of FIG. 5A.

Interposed between the upper arms 120 and 122 is a trigger handle reinforcement 128. As shown in FIGS. 5A-B, the trigger handle reinforcement 128 has a left upper ear 130 and a right upper ear 132 that are sandwiched between the clamp body 112 and the upper arms 120 and 122, respectively. The ears 130 and 132 have openings 134 and 136, respectively, that are aligned with openings 124 and 126, respectively.

Once the openings 124, 126, 134 and 136 are aligned with the openings of the channel, a pivot pin 138 is inserted through the openings 124,126,134 and 136 and the channel. The engagement with the pivot pin results in the trigger handle 118 being pivotably attached to the clamping body 112. The trigger handle 118 pivots about an axis P aligned with the channel, wherein the axis P intersects the openings 124 and 126 at a distance of approximately 6.75 inches from the bottom 140 of the trigger handle 118. The axis P is positioned approximately 1.25 inches above the top of the bar 104, approximately 2 inches from a proximal edge of the slot 108 and approximately 3/$ inches from a distal edge of the slot 106.

When the trigger handle 118 pivots about axis P, the trigger handle reinforcement 128 pivots in unison with the trigger handle 118 since the trigger handle reinforcement 128 is attached to the trigger handle 118. As shown in FIGS. 5A-B, the trigger handle reinforcement 128 has a pair of downwardly extending fingers 142 that are inserted into slots 144 formed in the lower portions of the arms 120 and 122.

Figure 6:
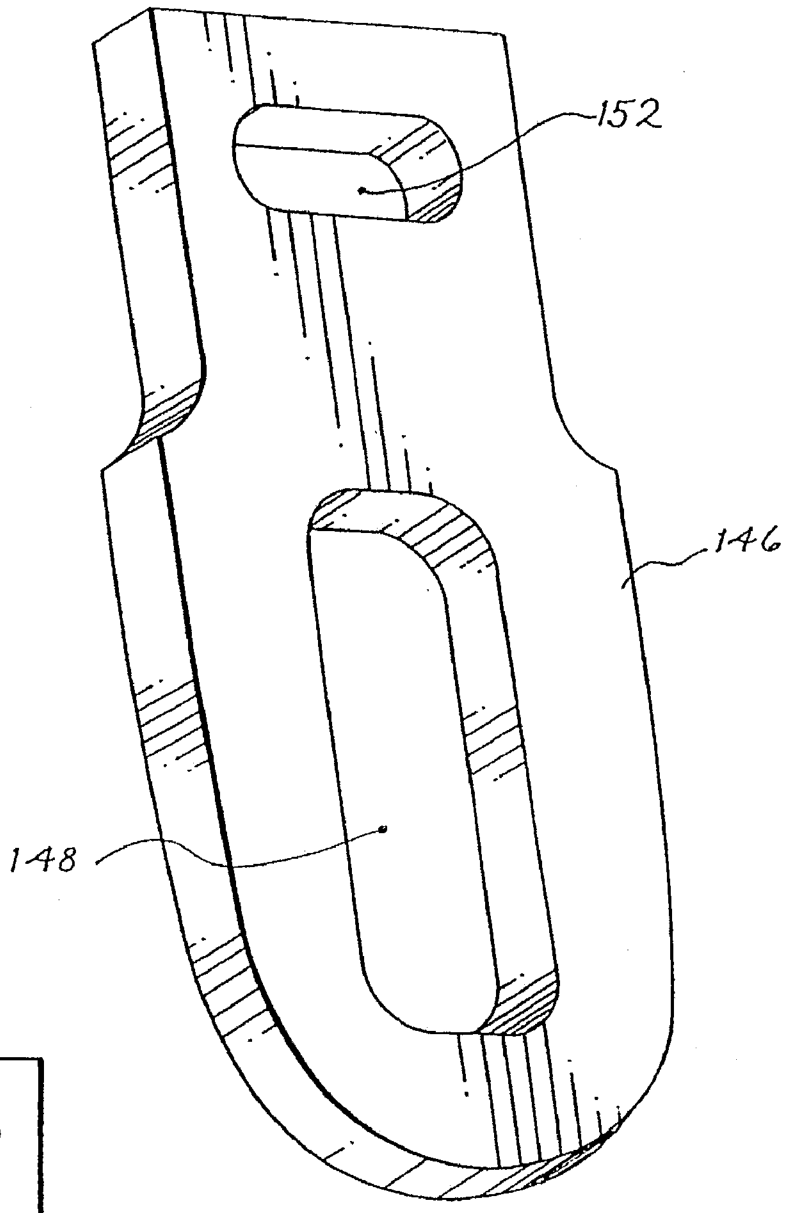
FIG. 6 shows a perspective view of an embodiment of a driving lever to be used with the bar clamp of FIG. 1.
Figure 7:
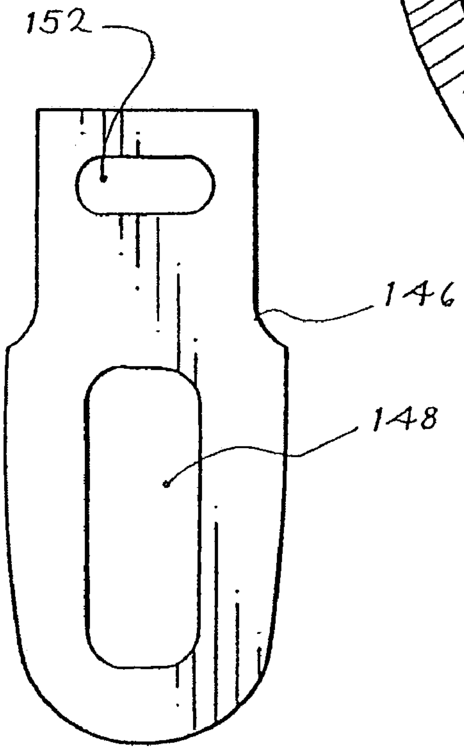
FIG. 7 shows a front view of the driving lever of FIG. 6.

The bar 104 and clamping jaw 102 are incrementally moved toward the fixed clamping jaw 116 via the actuation of one or more driving levers 146. As shown in FIGS. 3, 6, 7 and 8, the driving levers 146 are suspended on the bar 104, which passes through lower holes 148 formed in the driving levers 146. In addition, a driving lever link 150 passes through upper holes 152 formed in the driving levers 146. Each driving lever 146 is identical in shape with a rectangular-like in shape having a length of approximately 1.85 inches, a width of approximately 0.775 inches and a thickness of approximately 0.156 inches. The driving levers 146 are made of a resilient material, such as steel. As shown in FIGS. 6 and 7, the upper hole 152 is rectangular in shape having a height of approximately 0.165 inches and a length of approximately 0.386 inches. The lower hole 148 is rectangular in shape having a height of approximately 0.873 inches and a width of approximately 0.386 inches. The upper hole 152 is positioned directly above the lower hole 148 and spaced from one another by approximately 0.456 inches as measured from the lower edge of the upper hole 152 and the upper edge of the lower hole 148.

Figure 8:
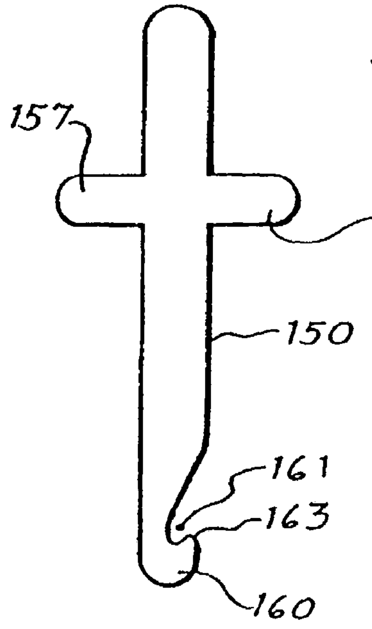
FIG. 8 shows a top view of an embodiment of a driving lever link to be used with the bar clamp of FIG. 1.
Figure 9:
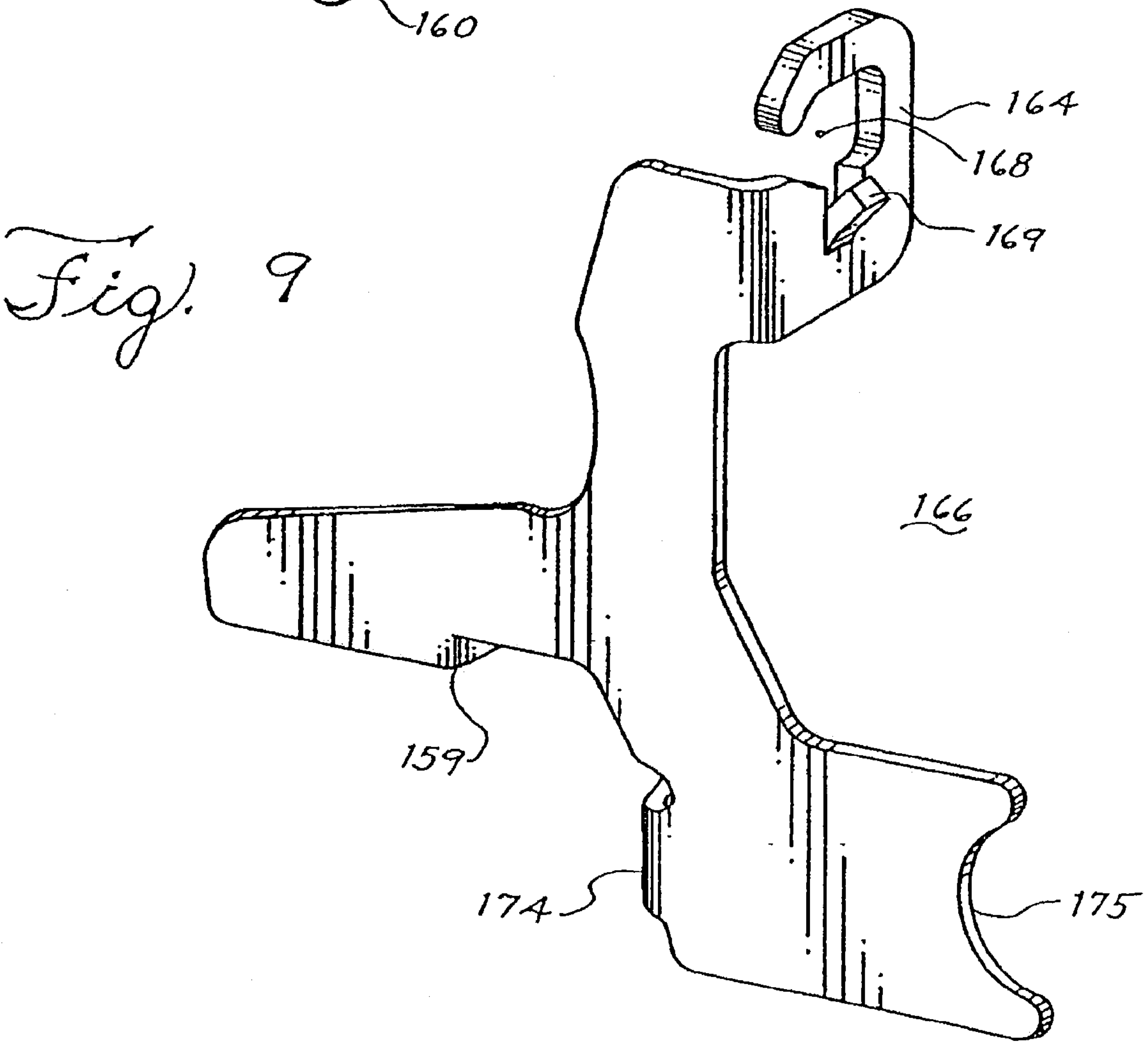
FIG. 9 shows a right perspective view of an embodiment of a link mechanism to be used with the bar clamp of FIG. 1.
Figure 10:
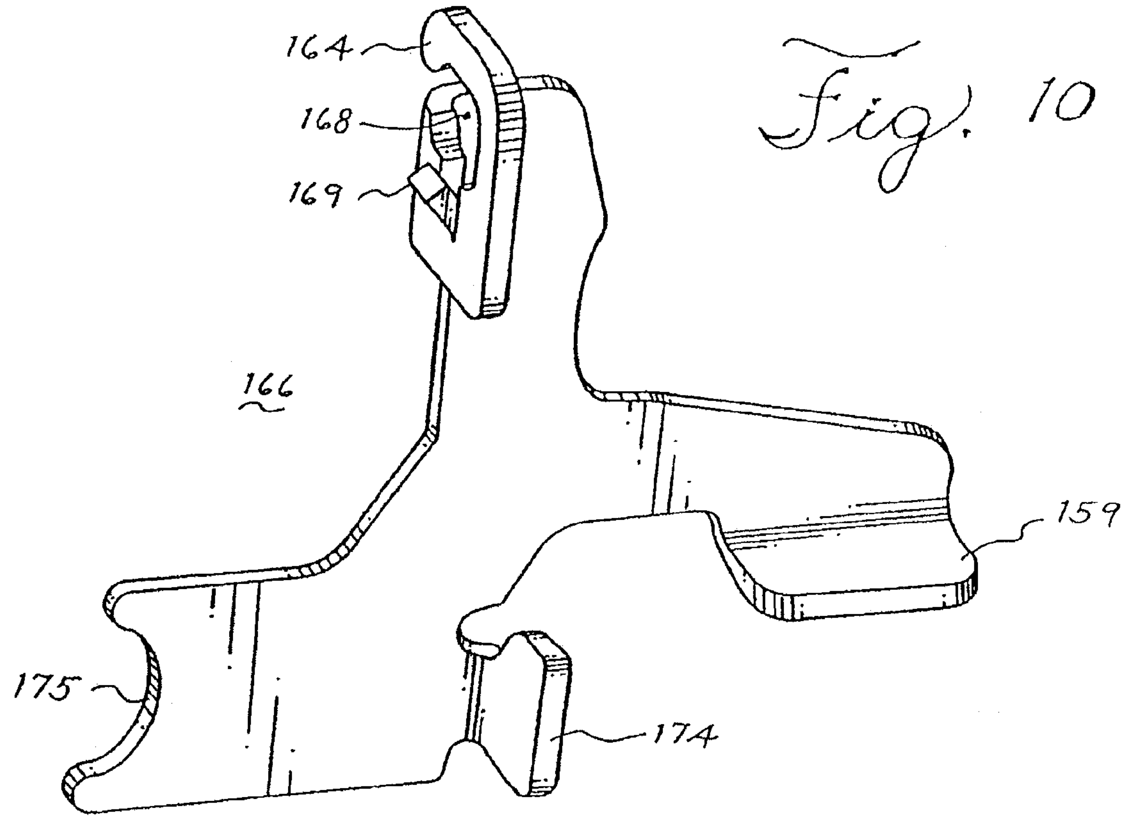
FIG. 10 shows a left perspective view of the link mechanism of FIG. 9.
Figure 11:
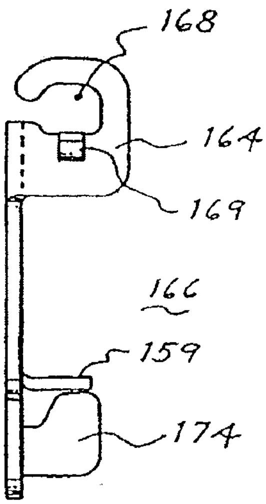
FIG. 11 shows a rear view of the link mechanism of FIG. 9.

The driving levers 146 are contained within side walls 154 of the trigger handle reinforcement 128. In addition, the trigger handle reinforcement 128 has an opening 156 that receives a proximal portion of the driving lever link 150. As shown in FIG. 8, the driving lever link 150 is shaped like a cross, where it has a length of approximately 3 Vs inches with two 3/ie inch arms 157 extending V/s inches from the proximal end of the driving lever link 150. The arms 157 engage the front face of the front driving lever 146. As shown in FIGS. 1,14 and 16, a distal portion of the driving lever link 150 extends past the driving levers 146 and has a biasing mechanism, such as spring 158, attached to the distal end 160 of the driving lever link 150. One of the functions of the driving lever link 150 is that it creates a pivoting linkage arrangement between the driving levers 146 and the trigger handle reinforcement 128 so that sliding between driving levers 146 and trigger handle reinforcement 128 are significantly reduced if not eliminated during actuation of the trigger handle 118 during the light load and heavy load modes of the clamp described below. Thus, the driving lever link 150 allows for a more efficient clamping mechanism and creates a higher clamping force for the same amount of hand squeeze.

As shown in FIG. 8, the distal end 160 of the driving lever link is formed as a hook so that a distal end of the spring 158 is threaded through the opening 161 and compressively engages a surface 163 of the hook. A proximal end 162 of the spring 158 engages an upper face 164 of a link mechanism 166. Note that spring 158 may be compressed in an original state so that the spring 158 would support loads slightly greater than the weight of the bar, such as 5 to 7 pounds, without alteration of its shape.

As shown in FIGS. 1, 6 and 7, the driving lever link 150 is inserted through an opening 168 formed in the upper face 164 of the link mechanism 166. A lower portion of the upper, front face 164 of the link mechanism 166 has a protrusion 169 that extends towards and normally contacts the rear face of the rear driving lever 146. The upper face 164 of the link mechanism 166 is positioned between the proximal end 162 of the spring 158 and a rear face of the rear driving lever 146. The configuration of the spring 158 is such that it biases the arms 157 of the driving lever link 150 against the forward driving lever 146. In addition, the spring 158 presses outward against the upper face 164 causing the distal end of the link mechanism 166 to engage the driving levers 146 and, thus, cause the arms 157 to press against the front driving lever which in turn causes the driving levers 146 to pivot about the bottom of the bar 104 away from the fixed jaw 116.

The link mechanism 166 is biased forward by a biasing mechanism, such as spring 170, that has a distal end that engages a stop 172 formed in the clamping body 112 and a proximal end that engages a lower vertical face 174 of the link mechanism 166. Note that the spring 170 has a spring constant that is sufficient to push the trigger handle 118 to the neutral position shown in FIG. 1. The forward bias of the link mechanism 166 causes the protrusion 169 of the upper face 164 of the linking mechanism 166 to press forward on the rear driving lever 146 and the arms 157 of the driving lever link 150. When the trigger handle 118 is at a neutral position where it is not squeezed, the pressing of the arms 157 described above counteracts and overcomes the forward pressing of the rear driving lever 146 so that the tops of the driving levers 146 are pivoted rearwardly of the bottoms of the driving levers 146 as shown in FIG. 1. At the neutral position, an arcuate shoulder 175 of the link mechanism 166 engages a grooved portion 177 of the trigger handle 118 so that the link mechanism presses against the trigger handle 118 so that it is pushed forward to the neutral position shown in FIG. 1. Any motion of the trigger handle 118 about the pivot axis P in the direction of the arrow 176 is accomplished against the bias of the spring 170.

Figure 12:
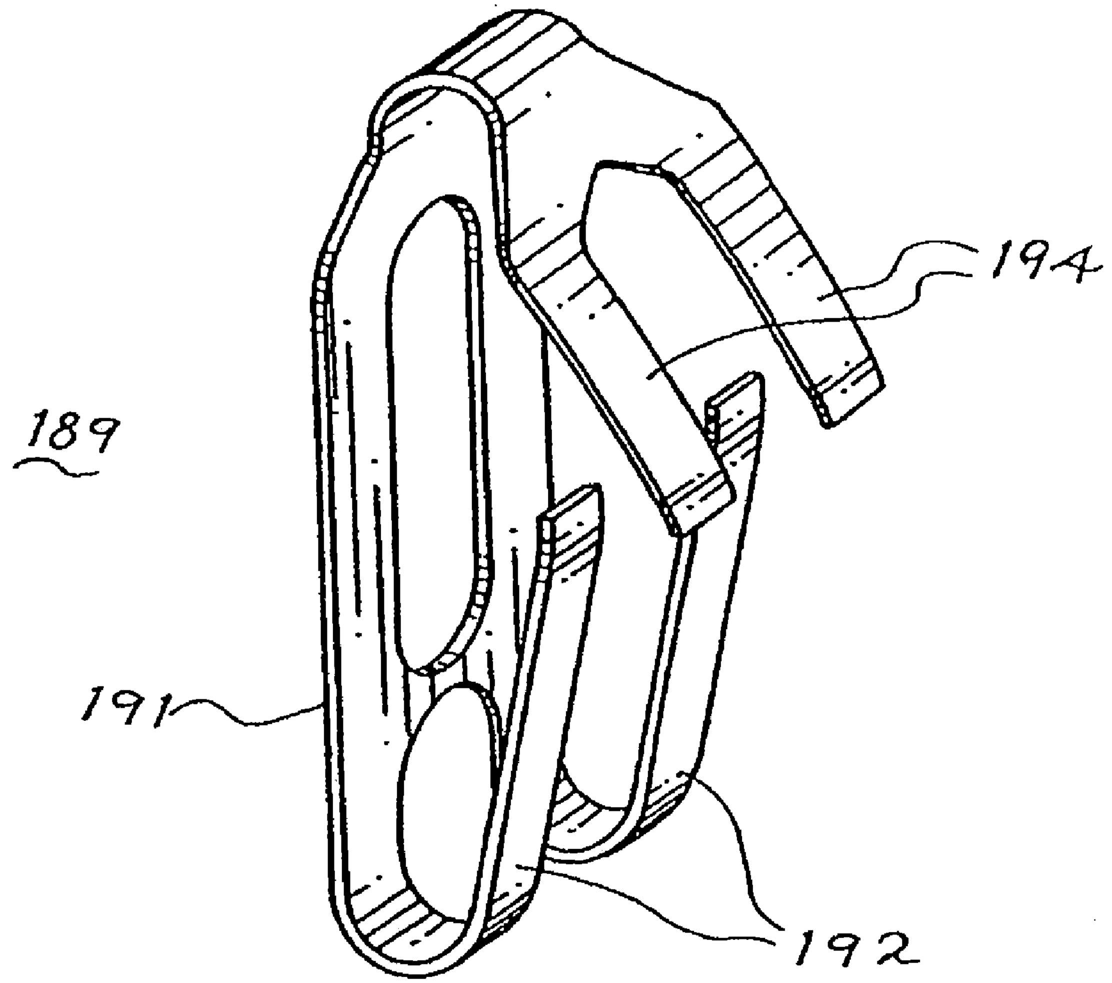
FIG. 12 shows a perspective view of an embodiment of a leaf-like spring to be used with the bar clamp of FIG. 1.

As shown in FIGS. 14, 16, 20 and 21, a pair of braking levers 178 and 180 are suspended from the bar 104. The bar 104 passes through openings 182 and 184 formed in the braking levers 178 and 180, respectively. Top ends 183 and 185 of the braking levers 178 and 180, respectively, are pivotably captured in recesses 186 and 188 formed within the clamp body 116 such that each of the braking levers 178 and 180 pivot within constraints defined by the surfaces of the recesses 186 and 188, respectively. Furthermore, the braking levers 178 and 180 bind with the bar 104 when the edges of the openings 182 and 184 formed in the braking levers 178 and 180 engage the surface of the bar 104. A leaf-like spring 189, as shown in FIGS. 12, 14 and 16, has a rear portion 191 that abuts a front portion 190 of the clamping body 112 and a front, bottom portion 192 that expansively engages the rear braking lever 180. The spring 189 has an upper, front portion 194 that passes through an opening 196 in the rear braking lever 180 and expansively engages a rear face of the front braking lever 178. Thus, the spring 189 normally simultaneously biases and positions the free ends 198 and 199 of the braking levers 178 and 180 away from the trigger handle 118. The normally biased positions of the braking levers 178 and 180 are limited by the binding interference and engagement between the openings 182 and 184 of the braking levers 178 and 180 with the bar 104 so as to engage the bar 104 and prevent the bar 108 and the movable clamping jaw 102 from moving away from the fixed clamping jaw 116 while allowing the clamping jaw 102 to move towards the fixed clamping jaw 116.

If a force is applied to the movable jaw 102 of FIG. 1 in the direction indicated by the arrow 176, the bar 104 is free to move through the openings 182 and 184 of the braking levers 178 and 180 and through holes 148 of the driving levers 146. Because the braking levers 178 and 180 are free to pivot against the bias of the spring 189 when force is applied on the movable jaw 102 in the direction of the arrow 176, the braking levers 178 and 180 do not engage the bar 104 and so do not present any obstacle to this motion of the bar 104 and the movable jaw 102 may be advanced continuously towards the fixed jaw 116.

Figure 13:
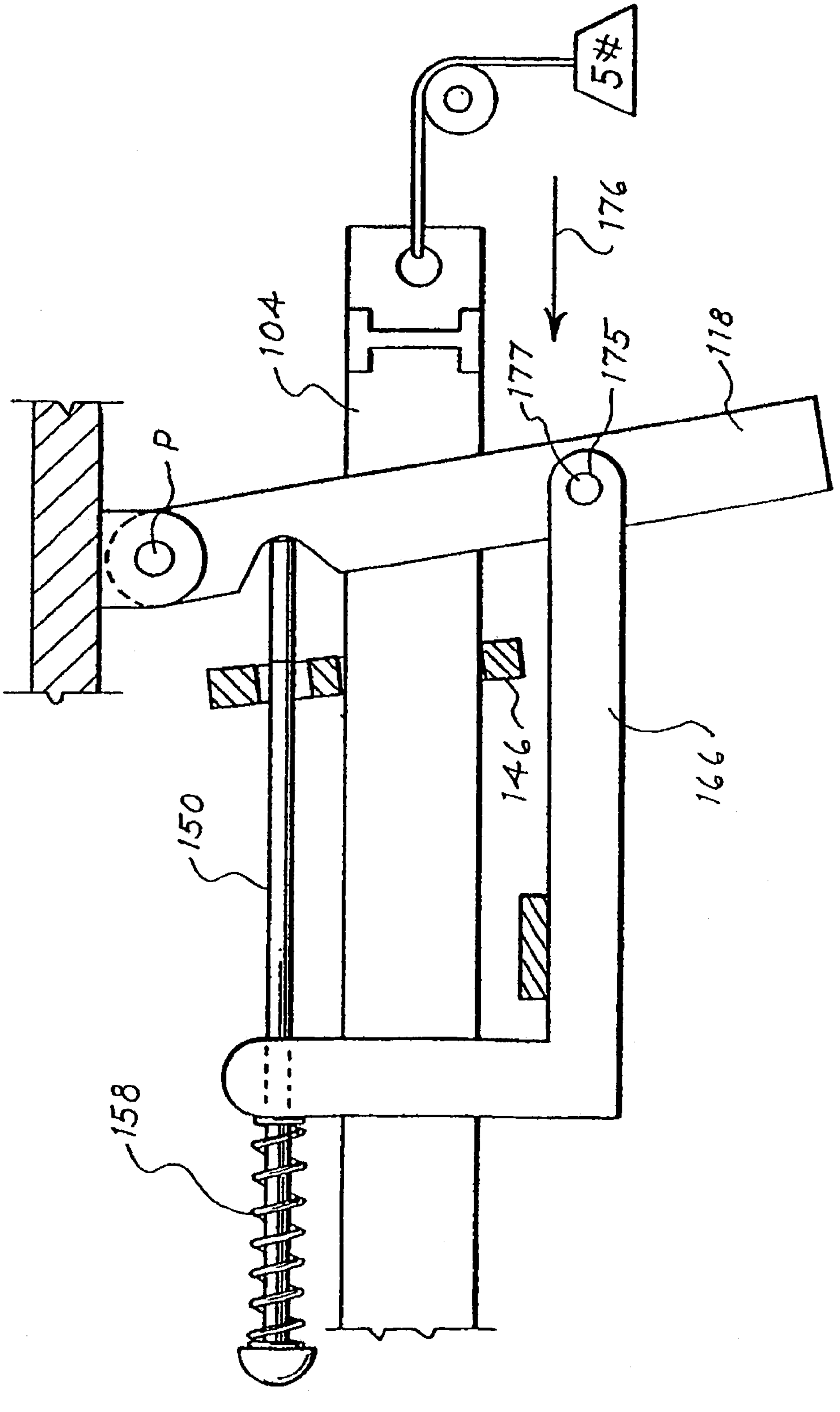
FIG. 13 schematically shows the operation of the bar clamp of FIG. 1 when a low force is applied while the trigger is at a neutral position.
Figure 15:
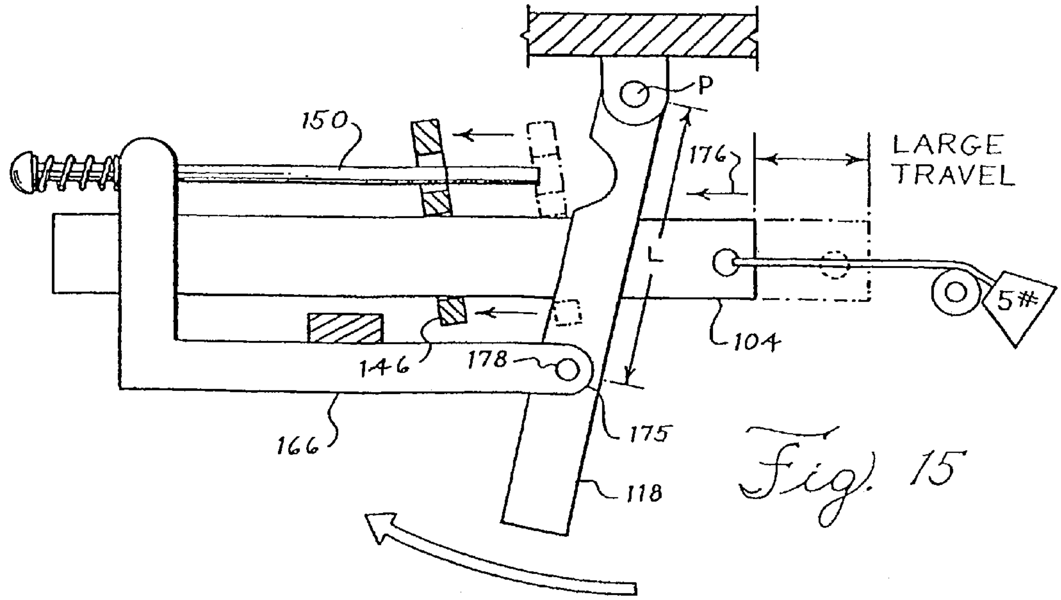
FIG. 15 schematically shows the operation of the bar clamp of FIG. 1 when a low force is applied while the trigger is at a closed position.
Figure 17:
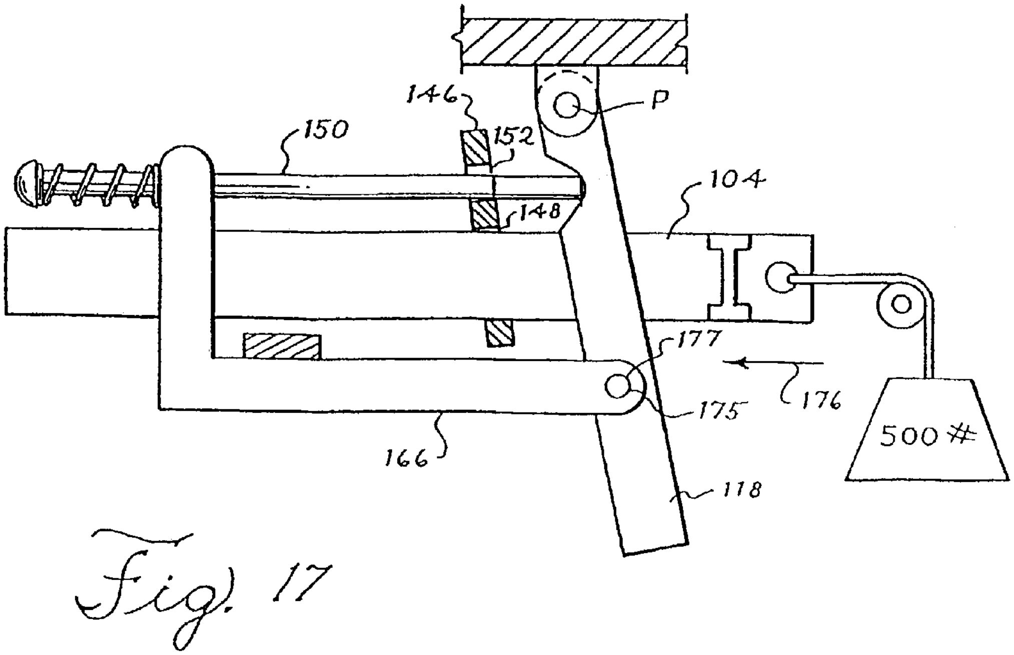
FIG. 17 schematically shows the operation of the bar clamp of FIG. 1 when a high force is applied while the trigger is at a neutral position.

Incremental motion of the bar 104 and the attached movable jaw 102 toward the fixed jaw 116 is made possible by squeezing the trigger handle 118 one or more times in the direction indicated by the arrow 176. As schematically shown in FIGS. 13, 15 and 17, the incremental motion of the bar 104 can be varied simultaneously as a function of the pressure or force exerted by the clamp. In particular, when the loads experienced by the bar are within a first given range, the bar 104 and movable jaw 102 move at a rapid rate. If the loads experienced by the bar are within a second given range outside the first given range, then the bar 104 and movable jaw 102 move at a slow rate. The bar clamp 100 has a discriminating structure in the guise of the spring 158 which controls the onset and magnitudes of the abovementioned ranges as will be explained below.

In one example, the spring 158 is chosen to have a spring constant and length so that when preloaded to a compressed state it does not further compress until a load of greater than the weight of the bar 104, such as five pounds, is encountered. In the case of light loads encountered by the movable jaw 102 that is below the below the threshold of approximately 5 Ibs for compression of the spring 158, the trigger handle 118 is moved to the neutral position shown in FIG. 13 via the engagement of the arcuate shoulder 175 of the link mechanism 166 with the grooved portion 177 of the trigger handle 118 in the manner described previously.

While the trigger handle 118 is at the neutral position, the spring 158 is at its normal preloaded compressed length so that the arms 157 of the driving lever link 150 engage the trigger handle reinforcement 128 directly and, thus, engage the trigger handle 118 indirectly as schematically shown in FIG. 13. Note that the arms 157 also engage the front driving lever 146.

When the trigger handle 118 is squeezed in the light load mode described above, the grooved portion 177 of the trigger handle 118 engages the arcuate shoulder 175 of the link mechanism 166 and pushes the link mechanism 166 rearwardly. The rearward movement of the link mechanism 166 causes the upper face 164 of the link mechanism 166 to engage the spring 158 and move the spring 158 rearwardly as well. However, since the load on the bar in the light load is slightly above 5 pounds, the rearward movement of the link mechanism 166 will be insufficient to overcome the spring 158 so that the spring 158 remains at its normal length during its rearward movement. As described previously, the driving lever link 150 is attached to spring 158 and so rearward movement of the spring 158 will result in rearward movement of driving lever link 150. Thus, the spring 158 joins the link mechanism 166 and driving lever link 150 tightly to one another so that they move in unison with one another. Accordingly, the driving lever link 150 and its arms 157 will move rearwardly with the rearward movement of the spring 158. The rearwardly moving arms 157 engage the driving levers 146 and move them and the engaged bar 104 rearwardly as well. As shown schematically in FIG. 15, the rearward movement of the arms 157 results in the disengagement of contact between the arms 157 and the trigger handle reinforcement 128 and thus the trigger handle 118. Thus, during its actuation the trigger handle 118 has a large lever arm L that promotes large incremental coarse movement. The lever arm has a length of approximately 2.5 inches that extends from the pivot point P to where the grooved portion 177 of the trigger handle 118 engages the arcuate shoulder 175 as shown in FIG. 15. It should be noted that during the incremental coarse movement the spring 158 does not flex and so a sluggish feel is avoided and a crisp responsive feel results during operation of the clamp during the light load mode.

As the trigger handle 118 is repeatedly squeezed, the movable jaw 102 approaches the fixed jaw 116 in an incremental manner. After a while, the object to be clamped will be engaged by both jaws 102 and 116. Continued squeezing of the trigger handle 118 causes the pressure or force exerted on the object and the jaws to increase.

In the case where the pressure on the movable clamping jaw 102 is increased to above the threshold for further compression of the spring 158 such as in the range from greater than 5 Ibs to approximately 500 Ibs for the example above, the bar clamp 100 is transformed so that the movable jaw 102 is moved incrementally in small increments and at higher pressures and forces. This mode of movement is schematically shown in FIGS. 17 and 18. As shown in FIG. 17, when the trigger handle 118 is at the neutral position via the engagement of the arcuate shoulder 175 of the link mechanism 166 with the grooved portion 177 of the trigger handle 118, the spring 158 is at its normal compressed length so that the arms 157 of the driving lever link 150 engage the trigger handle reinforcement directly and, thus, engage the trigger handle 118 indirectly. Note that the arms 157 also engage the front driving lever 146 as well.

When the trigger handle 118 is squeezed in the heavy load mode described above, the grooved portion 177 of the trigger handle 118 engages the arcuate shoulder 175 of the link mechanism 166 and pushes the link mechanism 166 rearwardly. The rearward movement of the link mechanism 166 causes the upper face 164 of the link mechanism 166 to engage the spring 158 and move the spring 158 rearwardly so that both the spring 158 and the upper face 164 separate from the rear driving lever 146. Since the load on the bar is above 5 pounds, the rearward movement of the link mechanism 166 is sufficient to overcome the spring 158 so that the spring 158 is compressed in length during its rearward movement. The compressed spring 158 will maintain having the link mechanism 150 and arms 157 engage the trigger handle reinforcement 128 directly and the trigger handle 118 throughout the squeezing of the trigger handle 118 as shown in FIG. 18. Thus, during its actuation the trigger handle 118 has a smaller lever arm L' that promotes small incremental movement. The lever arm L' has a length of approximately 0.6" that extends from the point P to the point Q where the arms 157 indirectly engages the trigger handle 118 via trigger handle reinforcement 128 as shown in FIG. 18. The end result is that the driving levers 146 undergo a finer movement of smaller increments than in the light load mode and at the same time the pressure/clamping forces exerted on the object are increased due to the presence of a greater mechanical advantage.

Note that in the embodiments shown in FIGS. 1-18 a preloaded spring 158 in a compressed state is employed. It is also possible to use a preloaded spring 158' in an expanded state as well. In such an embodiment, the spring 158' is chosen to have a spring constant and length so that when preloaded to an expanded state it does not further expand until a load of greater than the weight of the bar 104, such as five pounds, is encountered. In the case of light loads encountered by the movable jaw 102 that is below the below the threshold of approximately 5 Ibs for expansion of the spring 158', the trigger handle 118 is moved to the neutral position shown in FIG. 19 via the engagement of the arcuate shoulder 175 of the link mechanism 166 with the grooved portion 177 of the trigger handle 118 in the manner described previously. While the trigger handle 118 is at the neutral position, the spring 158 is at its normal preloaded expanded length so that the arms 157 of the driving lever link 150 engage the trigger handle reinforcement 128 directly and, thus, engage the trigger handle 118 indirectly as schematically shown in FIG. 19. Note that the arms 157 also engage the front driving lever 146.

When the trigger handle 118 is squeezed in the light load mode described above, the grooved portion 177 of the trigger handle 118 engages the arcuate shoulder 175 of the link mechanism 166 and pushes the link mechanism 166 rearwardly. The rearward movement of the link mechanism 166 causes the upper face 164 of the link mechanism 166 to engage the spring 158' and move the spring 158' rearwardly as well. However, since the load on the bar in the light load is slightly above 5 pounds, the rearward movement of the link mechanism 166 will be insufficient to overcome the spring 158' so that the spring 158' remains at its normal length during its rearward movement. Thus, the spring 158' joins the link mechanism 166 and driving lever link 150 tightly to one another so that they move in unison with one another. Accordingly, the driving lever link 150 and its arms 157 will move rearwardly with the rearward movement of the spring 158'. The rearwardly moving arms 157 engage the driving levers 146 and move them and the engaged bar 104 rearwardly as well. The rearward movement of the arms 157 results in the disengagement of contact between the arms 157 and the trigger handle reinforcement 128 and thus the trigger handle 118. Thus, during its actuation the trigger handle 118 has a large lever arm L that promotes large incremental coarse movement. The lever arm extends from the pivot point P to where the grooved portion 177 of the trigger handle 118 engages the arcuate shoulder 175.

As the trigger handle 118 is repeatedly squeezed, the movable jaw 102 approaches the fixed jaw 116 in an incremental manner. Continued squeezing of the trigger handle 118 causes the pressure or force exerted on the object and the jaws to increase.

In the case where the pressure on the movable clamping jaw 102 is increased to above the threshold for expansion of the spring 158' such as in the range from greater than 5 Ibs to approximately 500 Ibs for the example above, the bar clamp 100 is transformed so that the movable jaw 102 is moved incrementally in small increments and at higher pressures and forces. When the trigger handle 118 is at the neutral position via the engagement of the arcuate shoulder 175 of the link mechanism 166 with the grooved portion 177 of the trigger handle 118, the spring 158' is at its normal length so that the arms 157 of the driving lever link 150 engage the trigger handle reinforcement directly and, thus, engage the trigger handle 118 indirectly. Note that the arms 157 also engage the front driving lever 146 as well.

When the trigger handle 118 is squeezed in the heavy load mode described above, the grooved portion 177 of the trigger handle 118 engages the arcuate shoulder 175 of the link mechanism 166 and pushes the link mechanism 166 rearwardly. The rearward movement of the link mechanism 166 causes the upper face 164 of the link mechanism 166 to engage the spring 158' and move the spring 158' rearwardly so that both the spring 158' and the upper face 164 separate from the rear driving lever 146. Since the load on the bar is above 5 pounds, the rearward movement of the link mechanism 166 is sufficient to overcome the spring 158' so that the spring 158' is further expanded in length during its rearward movement. The expanded spring 158' will maintain having the link mechanism 150 and arms 157 engage the trigger handle reinforcement 128 directly and the trigger handle 118 throughout the squeezing of the trigger handle 118. Thus, during its actuation the trigger handle 118 has a smaller lever arm L' that promotes small incremental movement. The lever arm L' has a length of approximately 0.6" that extends from the point P to the point Q where the arms 157 indirectly engages the trigger handle 118 via trigger handle reinforcement 128. The end result is that the driving levers 146 undergo a finer movement of smaller increments than in the light load mode and at the same time the pressure/clamping forces exerted on the object are increased due to the presence of a greater mechanical advantage.

In either embodiment using the spring 158 or spring 158', the link mechanism 166 includes a horizontal leg 159 that bears against the bottom wall of the clamp body 112 that forms the slot 108 as shown in FIGS. 1, 9, 10, 14 and 16. Such engagement prevents the link mechanism 166 from rotating during operation of the clamp 100.

Note that when the braking levers 146 and the trigger handle 118 are not manually engaged and a force is applied to the movable jaw 102 of FIGS. 14 and 16 in the direction opposite to the direction indicated by the arrow 176, the edges of the openings 182,184 in the braking levers 178 and 180 bind against the surface of the bar 104 and it is not possible, without further action, to withdraw the movable jaw 102 further away from the fixed jaw 116.

Compression of the spring 189 by pressing on the braking levers 178 and 180 in the direction of the arrow 176, allows withdrawal of the bar 104 and movable jaw 102 away from the fixed jaw 116. This force results in the ends of the braking levers 178 and 180 being approximately perpendicular with respect to the direction of intended motion of the bar 104. Then the bar 104 is free to slide in either direction through the openings 182,184 in the braking levers 178, 180.

Figure 20:
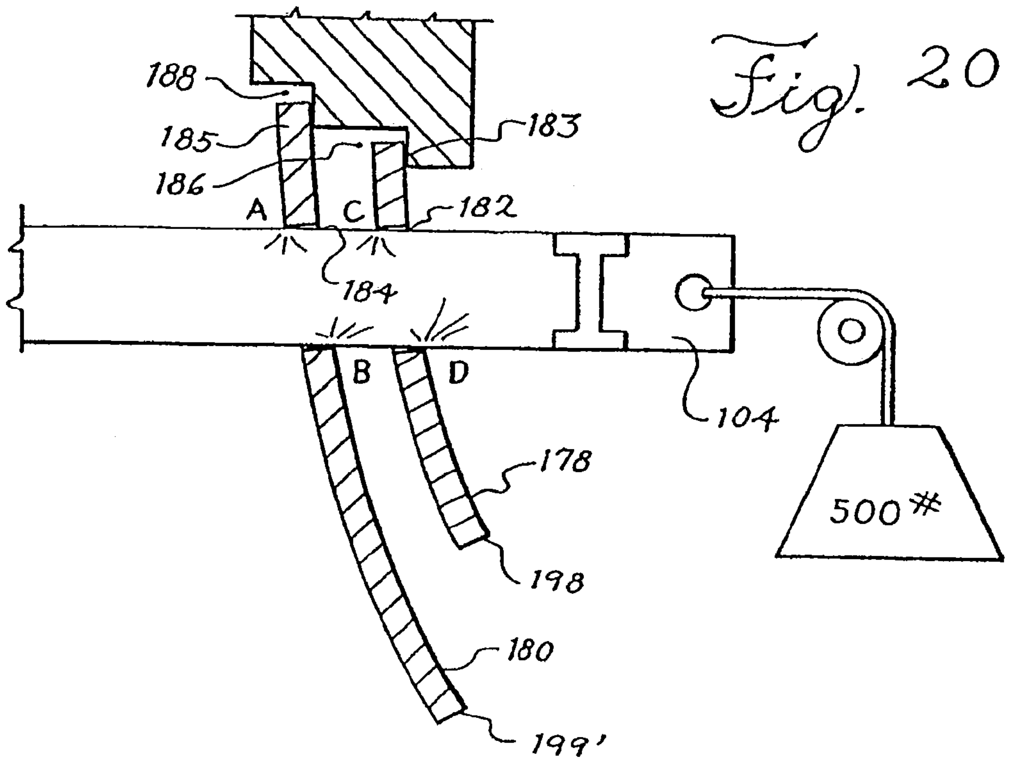
FIG. 20 schematically shows the operation of the bar clamps of FIGS. 1 and 19 when a high force is applied while a brake lever is applied.

When heavy loads ranging up to 500 Ibs are applied to the bar 104 and the braking levers 178 and 180 engage the bar 104, the top edges A and C of the openings of the braking levers 178 and 180 are loaded equally with respect to each other as shown in FIG. 20. Similarly, the bottom edges B and D of the openings of the braking levers 178 and 180 are loaded equally with respect to each other.

Figure 21:
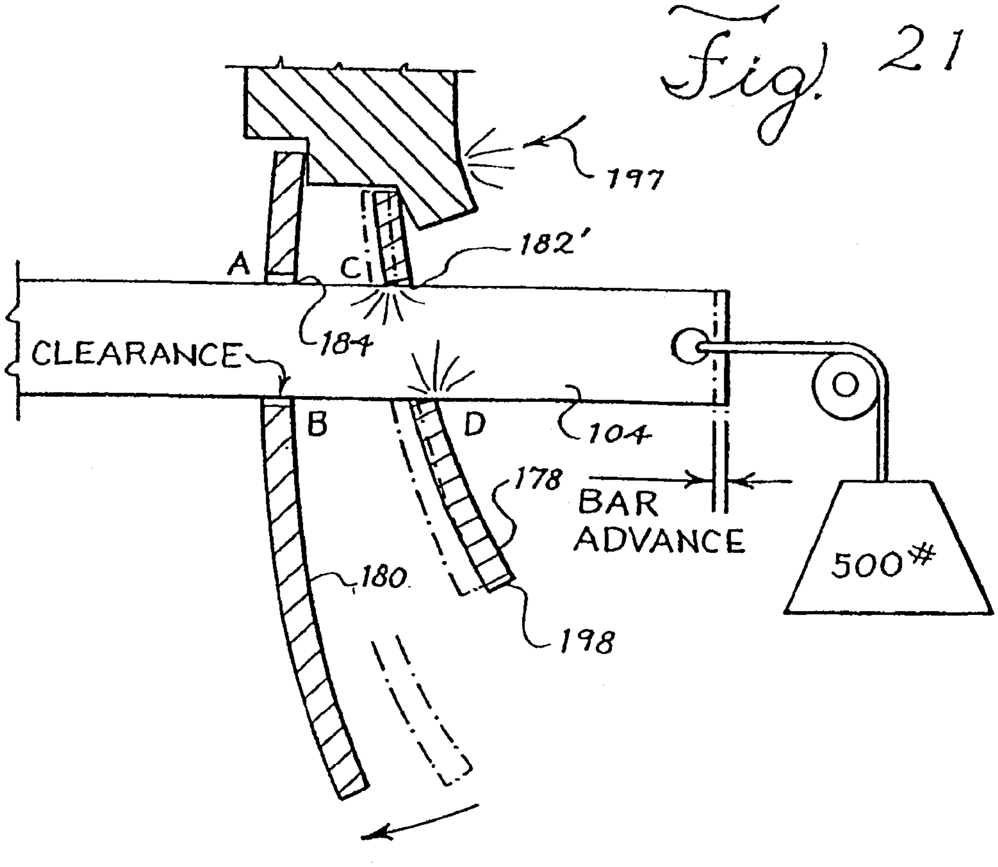
FIG. 21 schematically shows the operation of the bar clamps of FIGS. 1 and 19 when a high force is applied while a brake lever is released.

In order to easily release an object from the clamp 100 that is being subjected to heavy loads, the rear braking lever 180 is pulled to a vertical position where the edges A and B no longer engage the bar 104, as shown in FIG. 21. Pulling the rear braking lever 180 causes approximately one half of the original load to be dissipated by the deformation of a portion of the clamp body 112, schematically identified as the bent portion 197, and the deformation of the front braking lever 178. Such deformation causes the front braking lever 178 to move slightly forward as schematically illustrated by the bent portion 197 and the dashed lines of FIG. 21. Approximately the other half of the load is transferred onto the front braking lever 178 alone. Next, the rear braking lever 180 is released so that it returns to the position shown in FIG. 20. Once the rear braking lever 180 returns to the position of FIG. 20, it shares roughly one half of the load that is borne by front braking lever 178. Thus, the braking levers 178 and 180 share a total load that is approximately one half of the original load. The above process is repeated one or more times to approximately halve the total load with each cycle in the manner described above. Once a manageable total load is shared by the braking levers 178 and 180, both braking levers 178 and 180 can be simultaneously released from the bar 104 so that unwanted kickback is averted and all the clamping force is released. Note that above-described incremental decrease in clamping force can be accomplished by reversing the steps mentioned above and begin the reduction of force by pulling on the front braking lever 178 instead of the rear braking lever 180.

Note that the bar 104 has a rectangular cross-section. Of course, the bar 104 may have other cross-sectional shapes, such as a square, a circle, or a triangle. The openings in the driving levers 146 and the braking levers 178 and 180 are shaped to accommodate the cross-sectional shape of the bar 104 to provide proper binding interference with the bar 104.

The bar 104 has a pair of circular openings formed at either end. Cylindrical stop elements 193 and 195 are inserted into and permanently attached within the circular openings so that the stop elements 193 and 195 extend substantially perpendicular to the longitudinal axis of the bar 104. The stop element 193 is used to attach the movable jaw 102 in the manner described in pending U.S. patent application Ser. No. 09/036,360, the entire contents of which are incorporated herein by reference.

As the movable jaw 102 is moved away from the fixed jaw 116, the stop element 195 nears the rear of the slot 108. Upon reaching the rear of the slot 108, the ends of the stop element 195 contact the clamping body 112 outside of the slot 108. Thus, the stop element 195 prevents the movable jaw 102 from moving further away from the fixed jaw 116.

Figure 22:
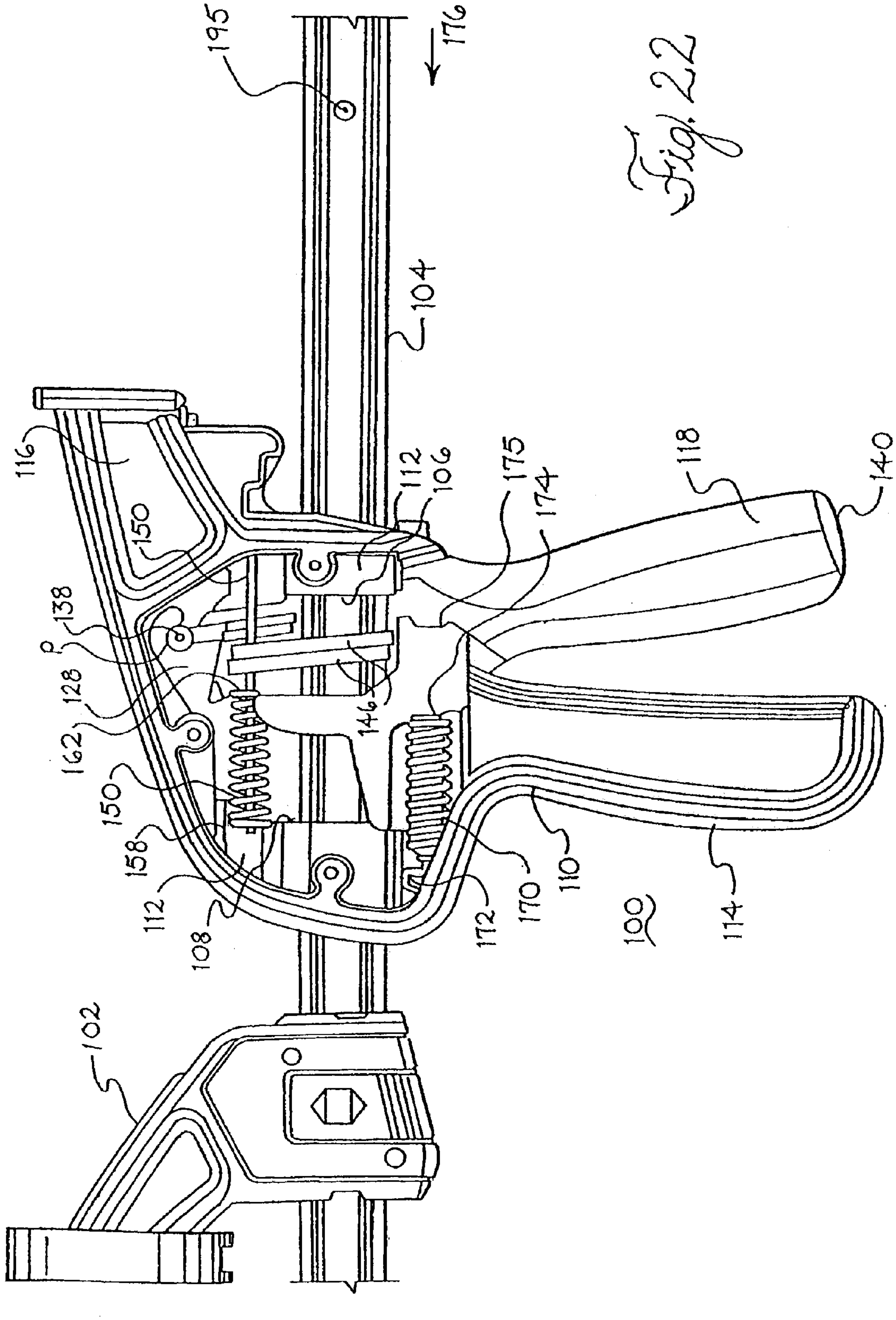
FIG. 22 shows a side view of a third embodiment of a bar clamp according to the present invention when the trigger is at a neutral position.

The bar clamp 100 of FIGS. 1-21 can be arranged to be a spreading clamp as shown in FIG. 22. This is accomplished by removing the movable jaw 102 from stop element 193 and attaching the movable jaw 102 to the other stop element 195 so that the faces of the movable jaw 102 and the fixed jaw 116 face away from each other. This conversion into a spreading clamp is described in U.S. patent application Ser. No. 09/036,360, the entire contents of which are incorporated herein by reference.

Figure 23:
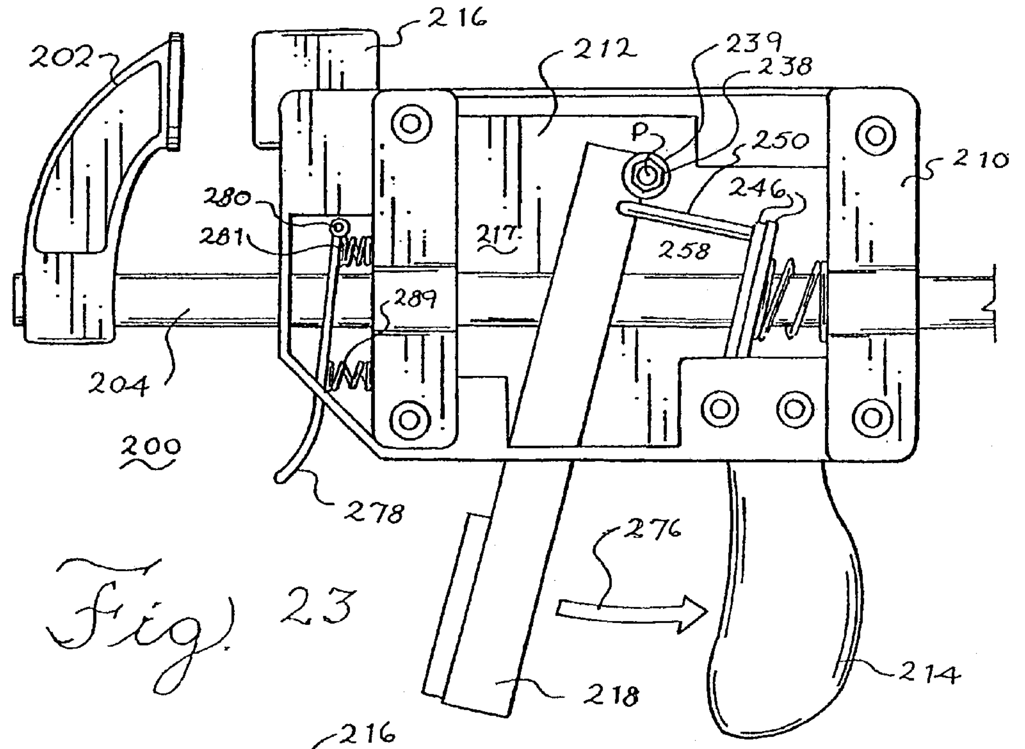
FIG. 23 shows a side view of a fourth embodiment of a bar clamp according to the present invention when the trigger is at a neutral position.
Figure 24:
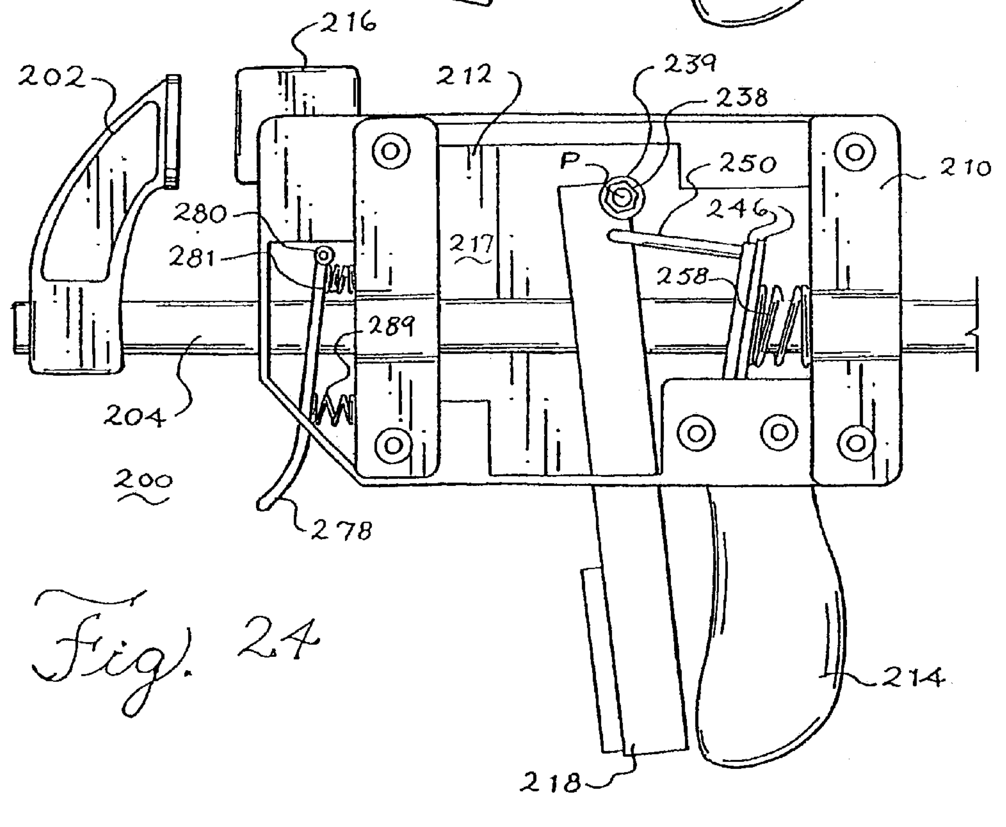
FIG. 24 shows a side view of the bar clamp of FIG. 23 when at a closed position.

As described above, the clamps 100 of FIGS. 1-22 have a structure for varying the incremental motion and the power based on the magnitude of the load encountered by the support element. It is possible to vary the incremental motion and/or the power of a clamp in other ways. For example, FIGS. 23 and 24 show a bar clamp 200 that provides increased leverage that allows for more strength to be applied with each squeezing of the trigger handle 218. As shown in FIGS. 23 and 24, the bar clamp 200 includes a clamping jaw 202 connected to a support element, such as a rod or a bar 204. The clamping jaw 202 may be fixed to the rod or bar 204 via a pin in the manner disclosed in U.S. Pat. No. 4,926,722 or it may have a detachable structure such as disclosed in U.S. patent application Ser. No. 09/036,360. The bar 204 is slidably supported in a proximal slot or bore and a distal slot or bore, each of which passes through a handle/grip assembly 210 and a clamp body 212.

As shown in FIGS. 23 and 24, the handle/grip assembly 210 also includes a handle grip 214 attached to the clamp body 212 and a fixed clamping jaw 216 attached to the clamp body 212. A cavity 217 in the clamp body 212 divides the slots from one another. Note that protective pads may be attached to the jaws 202 and 216. The trigger handle 218 is pivotably mounted to the body 212 above and between the slots via a threaded pivoting pin 238 and a threaded nut 239.

The bar 204 and clamping jaw 202 are incrementally moved toward the fixed clamping jaw 216 via the actuation of one or more driving levers 246. The driving levers 246 are suspended on the bar 204, which passes through lower holes formed in the driving levers 246. In addition, a power connecting bar 250 passes through upper holes formed in the driving levers 246 and is attached to the driving levers 246. Each driving lever 246 is identical in shape with a rectangular-like shape and is made of a resilient material, such as steel. The power connecting bar 250 is rectangular in shape, made of a resilient material and is inserted into a slot formed in the trigger handle 218 so as to be attached thereto.

As shown in FIG. 23, a spring 258 is placed over the bar 204 so as to compressively engage both the driving levers 246 and the clamp body 212. At the neutral position of the trigger handle shown in FIG. 23, the spring 258 and power connecting bar 250 cause the driving levers 246 to be pivoted with respect to the bar 204.

As shown in FIGS. 23 and 24, a braking lever 278 is suspended from the bar 204. The bar 204 passes through an opening formed in the braking lever 278. A top end of the braking lever 278 is pivotably attached to a pin 280 and spring 281 or captured in a recess formed within the clamp body 216 such that the braking lever 278 pivots from the top. Furthermore, a spring 289 biases the braking lever 278 so the edges of its opening engage the surface of the bar 204. In the neutral position shown in FIG. 23, the engagement of the braking lever 278 and the driving levers 246 with the bar 204 is such that the bar 204 and the movable clamping jaw 202 are prevented from moving away from the fixed clamping jaw 216 while allowing the clamping jaw 202 to move towards the fixed clamping jaw 216.

Incremental motion of the bar 204 and the attached movable jaw 202 toward the fixed jaw 216 is made possible by squeezing the trigger handle 218 one or more times in the direction indicated by the arrow 276. Squeezing causes the power connecting bar 250 to push the driving levers 246 away from the fixed jaw 216. Since the edges of the openings of the driving levers 246 bind on the bar 204 when moving away from the fixed jaw 216, the driving levers 246 pull the bar 204 and the jaw 202 toward the fixed jaw 216. The power connecting bar 250 is attached to the trigger handle 218 near the pivot axis P handle to establish a fulcrum near the axis P that transfers power during pivoting of the trigger handle 218 towards the driving levers 246. The fulcrum is established above the handle grip 214 where the power connecting bar 250 contacts the trigger handle 218. Note that the angle of the power connecting bar 250 and its interface with the driving levers 246 causes almost immediate engaging and moving of the bar 204 upon moving the trigger handle 218, and the leverage force applied to the driving levers is significantly higher than in prior bar clamps, due to the location of the power connecting bar 204 close to the pivot axis P of the trigger handle 218. The large lever arm of the trigger handle 218 is therefore working with the small lever arm at the attachment of power connecting bar 250 to trigger handle 218 to create a great mechanical advantage. Unlike the clamp 100 of FIGS. 1-22, the fulcrum does not move relative to the trigger handle 218 as a function of load encountered by the bar 204.

After the trigger handle 218 is fully squeezed to a closed position shown in FIG. 24, release of the trigger handle 218 will result in the compressed spring 258 to expand and push the driving levers 246 and the trigger handle 218 to the neutral position of FIG. 23.

As the trigger handle 218 is repeatedly squeezed, the movable jaw 202 approaches the fixed jaw 216 in an incremental manner. After a while, the object to be clamped will be engaged by both jaws 202 and 216.

Note that squeezing the braking lever 278 in the direction of the arrow 276, allows withdrawal of the bar 204 and movable jaw 202 away from the fixed jaw 216. This squeezing results in the ends of the braking lever being perpendicular with the direction of intended motion of the bar 204. Then the bar 204 is free to slide in either direction through the openings in the braking lever 278.

Figure 26:
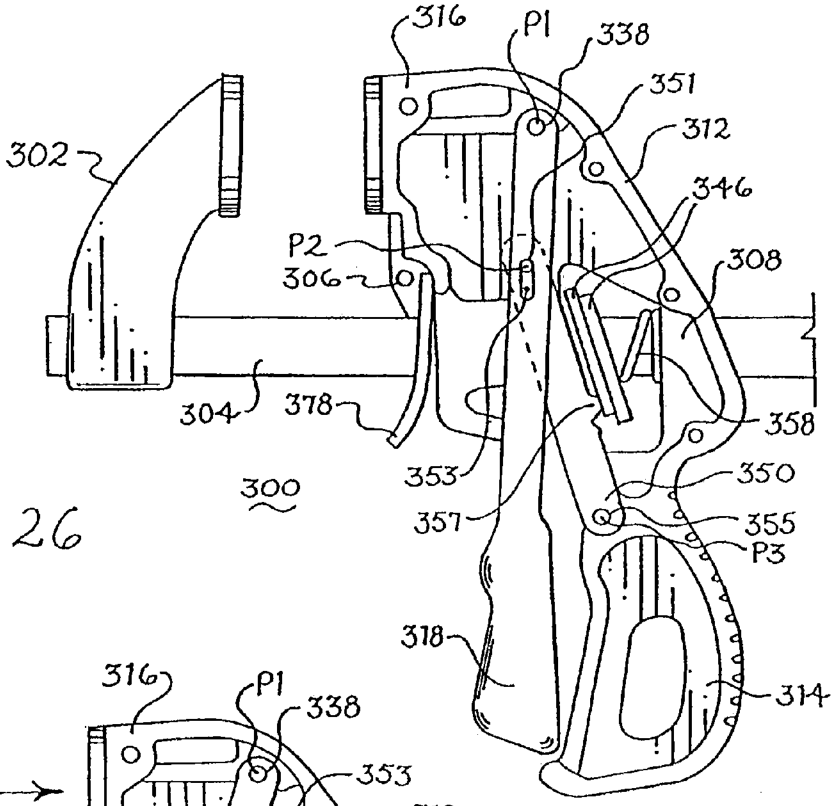
FIG. 26 shows a side view of the bar clamp of FIG. 25 when at a closed position.
Figure 25:
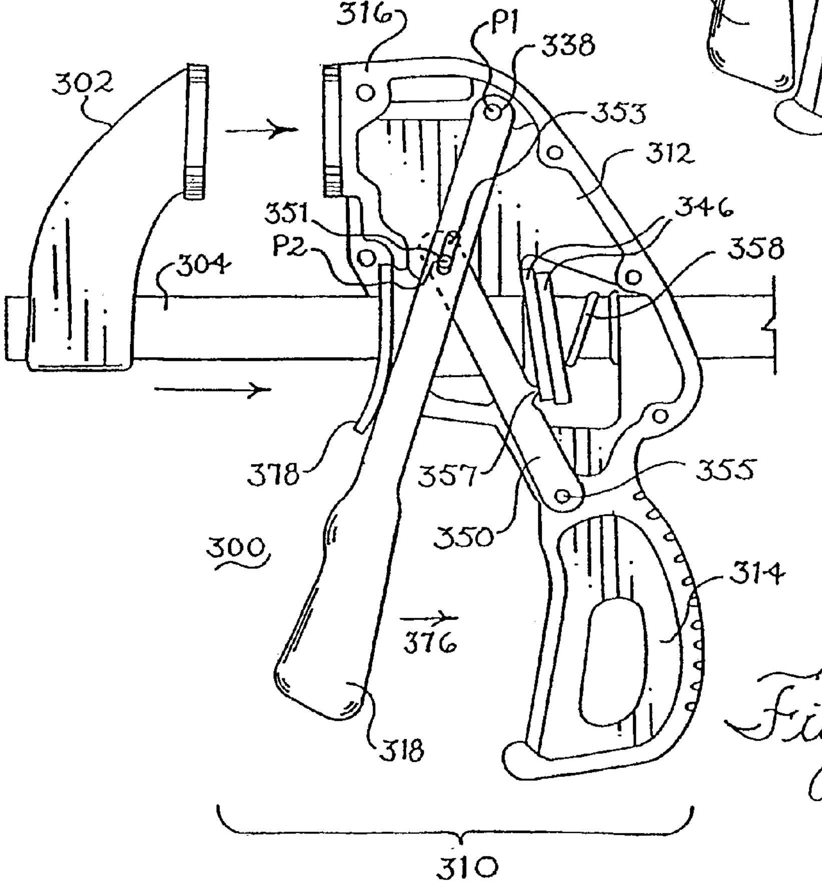
FIG. 25 shows a side view of a fifth embodiment of a bar clamp according to the present invention when the trigger is at a neutral position.

Another embodiment of a clamp that varies the pressure applied to an object is shown in FIGS. 25 and 26. In particular, the bar clamp 300 provides the advantage of incrementally adjusting the pressure exerted by the clamp 300. The bar clamp 300 includes a clamping jaw 302 connected to a bar 304. The clamping jaw 302 may be fixed to the bar 304 in the same manner as the clamping jaw 202 is attached to the bar 204 of FIGS. 23 and 24 as described previously. The bar 304 is slidably supported in proximal and distal slots 306, 308, respectively, each of which passes through a handle/grip assembly 310 and a clamp body 312.

As shown in FIGS. 25 and 26, the handle/grip assembly 310 also includes a handle grip 314 attached to the clamp body 312 and a fixed clamping jaw 316 attached to the clamp body 312. Protective pads may be attached to the jaws 302 and 316. A trigger handle 318 is pivotably mounted to the body 312 by a pivot pin 338 above and between the slots 306 and 308. The trigger handle 318 extends through the interior of the clamp body 312 and straddles the bar 304. The trigger handle 318 has a hollow portion, which receives a front portion of the handle grip 314 when the trigger handle 318 is fully squeezed. Alternatively, the trigger handle may extend through a generally solid clamp body. Furthermore, the trigger handle may extend only on one side of the bar 304.

The bar 304 and clamping jaw 302 are incrementally moved toward the fixed clamping jaw 316 via the actuation of one or more driving levers 346. The driving levers 346 are suspended on the bar 304, which passes through lower holes formed in the driving levers 346. In addition, a power connecting bar 350 slidingly engages the trigger handle 318 by having a pin 351 of the power connecting bar 350 inserted into a slot 353 formed in the trigger handle 318. The slot 353 has a length that is greater than twice the diameter of the pin 351 and is generally positioned between the bar 304 and a top portion of the clamp body 312. The slot 353 and pin 351 define a second pivot axis P2. As shown in FIGS. 25 and 26, a bottom end of the power connecting bar 350 is pivotably attached to the handle grip 314 by a pin 355 so as to define a third pivot axis P3. The power connecting bar 350 has an actuator protrusion or elbow 357 that engages a lower portion of the front driving lever 346. Each driving lever 346 is identical in shape with a rectangular-like shape and is made of a resilient material, such as steel. Note that the power connecting bar 350 may or may not straddle the bar 304. Note that additional coupling schemes between trigger handle 318 and power connecting bar 350 besides pin 351 and slot 353 are envisioned.

As shown in FIGS. 25 and 26, a spring 358 is placed over the bar 304 to compressively engage both the driving levers 346 and the clamp body 312. At the neutral position of the trigger handle shown in FIG. 25, the spring 358 and power connecting bar 350 cause the driving levers 346 to be pivoted with respect to the bar 304 to a nearly perpendicular position.

As shown in FIGS. 25 and 26, a braking lever 378 is suspended from the bar 304. The bar 304 passes through an opening formed in the braking lever 378. A top end of the braking lever 378 is captured in a recess formed within the clamp body 316 such that the braking lever 378 pivots from the top. Furthermore, a spring (not shown) biases the braking lever 378 so the edges of its opening engage the surface of the bar 304. In the neutral position shown in FIG. 25, the engagement of the braking lever 378 and the driving levers 346 with the bar 304 is such that the bar 304 and the movable clamping jaw 302 are prevented from moving away from the fixed clamping jaw 316 while allowing the clamping jaw 302 to move towards the fixed clamping jaw 316.

Incremental motion of the bar 304 and the attached movable jaw 302 toward the fixed jaw 316 is made possible by squeezing the trigger handle 318 one or more times in the direction indicated by the arrow 376. Such squeezing causes the trigger handle 318 to pivot about axis PI.

Pivoting of the trigger handle 318 about axis PI and continual compression pressure applied to the handle 318 brings the trigger handle 318 closer to the handle grip 312 and the power connecting bar 350. In addition, the pin 351 moves up the slot 353. The angle between the trigger handle 318 and the power connecting bar 350 decreases. The angle between an axis perpendicular to the pivot axis P3 and the power connecting bar 350 also decreases. During such incremental motion, a portion of trigger handle 318 extending from P1 to P2 is applied as a short lever to pin 351. A portion of power connecting bar 350 extending from P2 to P3 acts as a long lever to pin 351 while a portion of power connecting bar 350 extending from P3 to elbow 357 acts as a short lever on the driving levers 346. This compound leverage greatly increases mechanical advantage and significantly increases clamping forces.

The cooperation between the trigger handle 318 and the power connecting bar 350 causes the actuator protrusion 357 to engage the front driving lever 346 in a manner acting against the biasing force of the spring 358. Such engagement causes the driving levers 346 to move relative to the clamping body 312 away from the fixed jaw 316. Since the lower edges of the openings of the driving levers 346 engage the bar 304 during the engagement of protrusion 357, the movement of the driving levers 346 causes the bar 304 and jaw 302 to move towards the fixed jaw 316. It should be noted that through the force supplied against the driving levers 346 by the actuator protrusion 357, the front, upper surfaces of the driving levers 346 are moved in the opposite direction of the force indicated by arrow 376. The front, lower surfaces of the driving levers 346 move along the bar 304 in direction 376. The upper surfaces of the driving levers 346, having been moved along the bar 304, once the compression force in the direction of the arrow 376 is released, the spring 358 once again biases the driving levers 346 in the direction opposite of the arrow 376. In this manner, the driving levers 346 are incrementally advanced along the bar 304 thereby moving the movable clamp jaw 302 closer to the fixed clamp jaw 316. This incremental movement allows for careful, controlled pressure and greater pressure at the discretion of the user to be applied to any object contained within the fixed jaw 302 and movable jaw 316.

After the trigger handle 318 is fully squeezed to a closed position shown in FIG. 26, release of the trigger handle 318 will result in the compressed spring 358 to expand and push the driving levers 346 and the trigger handle 318 to the neutral position of FIG. 25.

As the trigger handle 318 is repeatedly squeezed, the movable jaw 302 approaches the fixed jaw 316 in an incremental manner. After a while, the object to be clamped will be engaged by both jaws 302 and 316.

Note that squeezing the braking lever 378 in the direction of the arrow 376, allows withdrawal of the bar 304 and movable jaw 302 away from the fixed jaw 316. This squeezing results in the ends of the braking lever being perpendicular with the direction of intended motion of the bar 304. Then the bar 304 is free to slide in either direction through the openings in the braking lever 378.

The foregoing description is provided to illustrate the invention, and is not to be construed as a limitation. Numerous additions, substitutions and other changes can be made to the invention without departing from its scope as set forth in the appended claims.

What is claimed is:

1. A method of operating a clamp comprising a first clamping jaw, a support element to which said first clamping jaw is attached and a trigger handle pivotably mounted to a clamp body, the method comprising:

actuating said trigger handle causing said first clamping jaw to experience incremental motion; and varying said incremental motion as a function of a load, where the load results from said support element or said support element and an object encountered by said support element by varying an effective lever arm length of said trigger handle by moving a fulcrum point into contact or out of contact with said trigger handle based on said load.

2. The method of claim 1, wherein said actuating comprises pivoting said trigger handle about an axis.

3. The method of claim 1, wherein said incremental motion is towards said second clamping jaw.

4. The method of claim 1, wherein said incremental motion is away from said second clamping jaw.

5. The method of claim 1, further comprising positioning said trigger handle to a position where said support element and first clamping jaw are prevented from moving away from said second clamping jaw while at the same time allowed to move towards said second clamping jaw.

6. The method of claim 1, wherein said varying said incremental motion comprises moving said support element at a rapid rate when said load has a magnitude within a predetermined range.

7. The method of claim 1, wherein said varying said incremental motion comprises moving said support element at a slow rate when said load has a magnitude within a predetermined range.

8. The method of claim 1, wherein the varying said incremental motion as a function of a load comprises varying an effective lever arm length of said trigger handle based on the magnitude of said load.

9. The method of claim 1, wherein the varying said incremental motion as a function of a load comprises varying an effective lever arm to a first effective lever arm length when said load is within a predetermined range and to a second effective lever length when said load is within a second predetermined range.

10. The method of claim 9, wherein said second effective lever arm length is less than said first effective lever arm length.

11. A method for operating a clamp comprising a first clamping jaw, a support element;

a clamp body, a driving lever and a trigger handle movably mounted to the clamp body and for engaging said driving lever, the method comprising:

actuating the trigger handle causing a driving lever to move to a first position where said driver lever engages said support element and causes said support element to move relative to said clamp body, varying incremental motion of the support element by moving a fulcrum point into or out of contact with the trigger handle as a function of load encountered by the support element by transmitting a first force from a first location on the trigger handle to the driving lever such that the support element moves at a first rate and transmitting a second force from a second location on the trigger handle to the driving lever such that the support element moves at a second rate, wherein the first force is different from the second force and the first rate is different from the second rate.

12. The method of claim 11, wherein the first force is based on a load encountered by said support element that has a magnitude within a first predetermined range and wherein the second force is based on a second load encountered by said support element that has a magnitude within a second predetermined range.

13. A method of operating a clamp comprising a first clamping jaw, a support element; a clamp body, and a trigger handle movably mounted to the clamp body, the method comprising:

actuating the trigger handle to generate a force for moving a driving lever to a first position where the driving lever engages the support element and causes the support element to move relative to the clamp body;

varying incremental motion of the support element as a function of a load encountered by the support element by varying an effective lever arm of said trigger handle by causing a spring to move between a substantially compressed length when a load on the support element is above a threshold and a normal length when the load on the support element is below the threshold, wherein said spring actuates said driving lever through a driving lever link.

14. The method of claim 13, wherein said driving lever link is a portion of the driving lever such that the driving lever link an effective extension to the driving lever.

15. The method of claim 13, positioning a brake lever so that it is normally positioned so as to engage said support element so as prevent said support element and said first clamping jaw from moving away from said second clamping jaw and allowing said first clamping jaw to move towards said second clamping jaw.

16. The clamp of claim 13, wherein said spring moves said driving lever which in turn moves said support element.

* * * * *